(12) United States Patent
Tanaka et al.

(10) Patent No.: US 8,130,644 B2
(45) Date of Patent: Mar. 6, 2012

(54) MECHANISM FOR ENABLING LOAD BALANCING TO BE ACHIEVED IN A LOOP-FREE SWITCHING PATH, REVERSE PATH LEARNING NETWORK

(75) Inventors: Bert H. Tanaka, Saratoga, CA (US); Daniel J. Maltbie, Santa Cruz, CA (US); Joseph R. Mihelich, Fremont, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 12/490,938

(22) Filed: Jun. 24, 2009

(65) Prior Publication Data

US 2009/0316584 A1    Dec. 24, 2009

Related U.S. Application Data

(63) Continuation of application No. 11/336,713, filed on Jan. 20, 2006, now abandoned, which is a continuation-in-part of application No. 11/056,436, filed on Feb. 10, 2005, now Pat. No. 7,463,588.

(60) Provisional application No. 60/545,788, filed on Feb. 18, 2004.

(51) Int. Cl.
*H04L 12/26* (2006.01)
(52) U.S. Cl. ............... 370/230.1; 370/392; 370/465; 370/474
(58) Field of Classification Search .............. None
See application file for complete search history.

(56) References Cited

U.S. PATENT DOCUMENTS

| | | | |
|---|---|---|---|
| 6,122,674 A | 9/2000 | Olnowich | |
| 6,188,694 B1 * | 2/2001 | Fine et al. | 370/402 |
| 6,247,058 B1 | 6/2001 | Miller et al. | |
| 6,389,017 B1 | 5/2002 | Patel et al. | |
| 6,438,603 B1 | 8/2002 | Ogus | |
| 6,470,031 B1 * | 10/2002 | Loy et al. | 370/503 |
| 6,535,482 B1 | 3/2003 | Hadi Salim et al. | |
| 6,563,818 B1 * | 5/2003 | Sang et al. | 370/379 |

(Continued)

FOREIGN PATENT DOCUMENTS

EP    1109376    6/2011

(Continued)

OTHER PUBLICATIONS

Passmore, D. et al., The Virtual LAN Technology Report. 22 Pages. Mar. 7, 1997.

(Continued)

*Primary Examiner* — Chirag Shah
*Assistant Examiner* — Salvador E Rivas
(74) *Attorney, Agent, or Firm* — Hamilton, DeSanctis & Cha LLP

(57) ABSTRACT

A mechanism is disclosed for enabling load balancing to be achieved in a loop-free switching path, reverse path learning network, such as an Ethernet network. The network is divided into a plurality of virtual networks, with each virtual network providing a different path through the network. When it comes time to send a set of information through the network, one of the plurality of virtual networks, and hence, one of the plurality of paths, is selected. The set of information is then updated to indicate the selected virtual network, and sent into the network to be transported along the selected path. With multiple paths, and with the ability to select between the multiple paths, it is possible to balance the load imposed on the multiple paths.

56 Claims, 9 Drawing Sheets

U.S. PATENT DOCUMENTS

| | | | |
|---|---|---|---|
| 6,580,715 B1 | 6/2003 | Bare | |
| 6,590,861 B1 | 7/2003 | Vepa et al. | |
| 6,614,787 B1 * | 9/2003 | Jain et al. | 370/390 |
| 6,738,352 B1 * | 5/2004 | Yamada et al. | 370/238 |
| 7,457,868 B1 | 11/2008 | Guo | |
| 7,463,588 B1 | 12/2008 | Tanaka et al. | |
| 2003/0039212 A1 | 2/2003 | Lloyd et al. | |
| 2003/0048750 A1 * | 3/2003 | Kobayashi | 370/229 |
| 2003/0123448 A1 * | 7/2003 | Chang | 370/395.1 |
| 2004/0151180 A1 * | 8/2004 | Hu et al. | 370/392 |
| 2005/0122983 A1 | 6/2005 | Gilmartin et al. | |
| 2005/0135247 A1 | 6/2005 | Scott | |
| 2006/0126496 A1 | 6/2006 | Filsfils et al. | |
| 2009/0304007 A1 | 12/2009 | Tanaka et al. | |

FOREIGN PATENT DOCUMENTS

| | | |
|---|---|---|
| WO | 00/13376 | 3/2000 |

OTHER PUBLICATIONS

Final Rejection for U.S. Appl. No. 11/732,601 mailed Mar. 29, 2010.

Understanding Multiple Spanning Tree Protocol (802.1S). Document ID: 24248. Apr 17, 2007, 13 pages.

User Guide for Campus Manager 4.0 CiscoWorks. 10-68, Copyright 1998-2005.

Non-Final Rejection for U.S. Appl. No. 11/732,599 mailed Apr. 28, 2010.

* cited by examiner

MECHANISM FOR ENABLING LOAD BALANCING TO BE ACHIEVED IN A LOOP-FREE SWITCHING PATH, REVERSE PATH LEARNING NETWORK

PRIORITY INFORMATION

This application is a continuation of U.S. application Ser. No. 11/336,713, entitled MECHANISM FOR ENABLING LOAD BALANCING TO BE ACHIEVED IN A LOOP-FREE SWITCHING PATH, REVERSE PATH LEARNING NETWORK, filed on Jan. 20, 2006 now abandoned, which is a continuation-in-part of U.S. application Ser. No. 11/056,436, entitled MECHANISM FOR ENABLING LOAD BALANCING TO BE ACHIEVED IN A LOOP-FREE SWITCHING PATH, REVERSE PATH LEARNING NETWORK, filed on Feb. 10, 2005, now issued as U.S. Pat. No. 7,463,588, which claims the benefit of U.S. Provisional Application Ser. No. 60/545,788, entitled A MECHANISM FOR LOAD BALANCING TRAFFIC IN A LOOP-FREE SWITCHING PATH, REVERSE PATH LEARNING NETWORK, filed on Feb. 18, 2004. The entire contents of all these applications are incorporated by reference as if fully set forth herein.

BACKGROUND

Over the past several years, the computing and storage server industries have been migrating towards a network-based computing and storage model to take advantage of lower cost, high-performance commodity processors and lower cost, high-density storage media. This server industry trend has created a need for a highly scalable interconnect technology to enable the various computing and storage resources to be efficiently and effectively coupled. One type of interconnect that has been considered for this purpose is an Ethernet network.

An Ethernet network is a loop-free switching path, reverse path learning network. By "loop-free", it is meant that there is only one path between any pair of nodes in the network. Because of this loop-free property, it is possible for the switches in an Ethernet network to forward packets by broadcast flooding, and to populate their forwarding tables through reverse path learning.

Specifically, when an Ethernet switch encounters a packet with a destination node address that it does not have in its forwarding tables, the switch broadcasts that packet on all outgoing links, except for the link on which the packet was received. All subsequent switches that receive the packet that do not have the destination node address in their forwarding tables do the same thing. Eventually, the packet will be delivered to the destination node. Because there is only one path to the destination node, it is assured that broadcasting the packet in this way will not create an infinite loop of broadcasts.

In addition to broadcasting the packet, a switch also determines, from the packet, the address of the source node that sent the packet. It also notes the link on which the packet was received. This address and link association is stored in the forwarding tables of the switch. In the future, if the switch receives any packet destined for the source node, it will know, based upon the address and link association in the forwarding tables, which link to switch the packet to. It will not need to broadcast the packet. In this way, an Ethernet switch learns the reverse path of a packet. Because of this reverse path learning capability, it is not necessary to pre-configure the forwarding tables of Ethernet switches. The switches can build these forwarding tables on the fly. This self learning capability of Ethernet switches is a key "plug and play" attribute of an Ethernet network, and is one of the reasons why Ethernet is so widely deployed.

While the loop-free aspect of an Ethernet network gives rise to certain advantages, it also is the root of several significant drawbacks. First, because there is only one path between each pair of nodes, the network does not recover from failure as quickly as would be desired. When a link in a path is disabled, another path has to be determined and deployed. This takes a relatively long time, and during that time, nodes coupled via that link cannot communicate. Another drawback is that the single path between each pair of nodes limits the cross section bandwidth of the network; thus, the switching capacity of the network is underutilized. Furthermore, because there is only one path between each pair of nodes, it is not possible to spread and balance the traffic across a plurality of paths. For these and other reasons, Ethernet, as it has been implemented, has not been an effective interconnect for coupling computing and storage resources in a network-based, high-performance system.

SUMMARY

In accordance with one embodiment of the present invention, there is provided a mechanism that enables load balancing to be achieved in a loop free switching path, reverse path learning network, such as an Ethernet network.

As noted previously, in a typical Ethernet network, there is only one path between any pair of components. Because there is only one path, it is not possible to balance the traffic load between a pair of components across a plurality of paths. To enable load balancing, multiple paths need to be provided. In one embodiment, multiple paths are provided by way of virtual networks. More specifically, the network is divided into a plurality of virtual networks, and each virtual network provides a different path through the network from one component to another. The virtual networks are implemented in such a way that the switches in the network may still broadcast packets without causing infinite broadcast loops, and may still perform reverse path learning. Thus, despite the fact that there are multiple possible paths between components, the overall network is still a loop-free switching path, reverse path learning network. Because it remains this type of network, it retains all of the associated advantages, including the "plug and play" capability mentioned above.

In such a system, a set of information may be sent from a source node to a destination node as follows. Initially, a network interface that interfaces the source node to the network acquires from the source node a set of information that is destined for the destination node. The set of information specifies an address for the destination node or comprises information from which the address can be derived. The network interface determines a set of virtual networks that can be used to transport the set of information from the source node to the destination node. The network interface then selects a particular virtual network from the set of virtual networks. In one embodiment, this selection is done after the address of the destination node is specified or derived. Because each virtual network provides a different path through the network from the source node to the destination node, selecting a particular virtual network, in effect, selects a particular path. In one embodiment, the selection of the particular virtual network, and hence, the particular path is done in such a manner as to balance the traffic load across the multiple paths. For example, the particular virtual network may be selected in a random manner or in a round-robin fashion. It may also be selected based upon current traffic conditions (e.g. which path is currently the least loaded, which path currently has the most capacity for carrying traffic, etc.).

After the particular virtual network is selected, the network interface updates the set of information to include information indicating the particular virtual network that has been selected. The network interface then sends the updated set of information into the network to allow the network to transport the updated set of information to the destination node along the particular path. In this manner, the set of information is sent to the destination node along one of multiple paths. In one embodiment, the network interface processes every set of information sent from the source node to the destination node in this way. Thus, load balancing can be performed on a dynamic, packet by packet basis, in a loop-free switching path, reverse path learning network.

In the embodiment discussed above, the path selection and load balancing functions are performed by a network interface coupled to the source node. As an alternative, the path selection and load balancing functions may be implemented by a multi-path load balancing (MPLB) component that is separate from the network interface. This MPLB may be used to couple a node or any other type of network component (e.g. switch, router, etc.) to the network. Because of the variety of components to which it may be coupled, the MPLB needs to be able to handle more types of information than a network interface. As a result, the operation of an MPLB is slightly different.

More specifically, when an MPLB receives a packet (i.e. a set of information) from a component external to the network, it determines a packet type for that packet. It then determines whether path selection is appropriate for that packet type. In one embodiment, there are some packet types for which path selection is not appropriate. If path selection is appropriate for the packet type, then the MPLB selects a virtual network, and hence, a path for the packet to take through the network. This selection may be carried out in a manner similar to that discussed above. On the other hand, if path selection is not appropriate for the packet type, then the MPLB foregoes path selection, and instead, processes the packet in a manner that is appropriate for the packet type. This may entail simply forwarding the packet unmodified, or performing some additional functions. By processing packets in this way, it is possible to move the path selection and load balancing functions off of the network interface, which in turn, enables any network interface to be used to couple a node to the network. This and other benefits may be realized with an MPLB.

DETAILED DESCRIPTION OF EMBODIMENT(S)

One embodiment of the present invention is implemented in a loop-free switching path, reverse path learning network, such as an Ethernet network. Before describing this embodiment in detail, some additional information on Ethernet networks will be provided to facilitate a complete understanding of the invention.

Ethernet Networks

Figure 1:
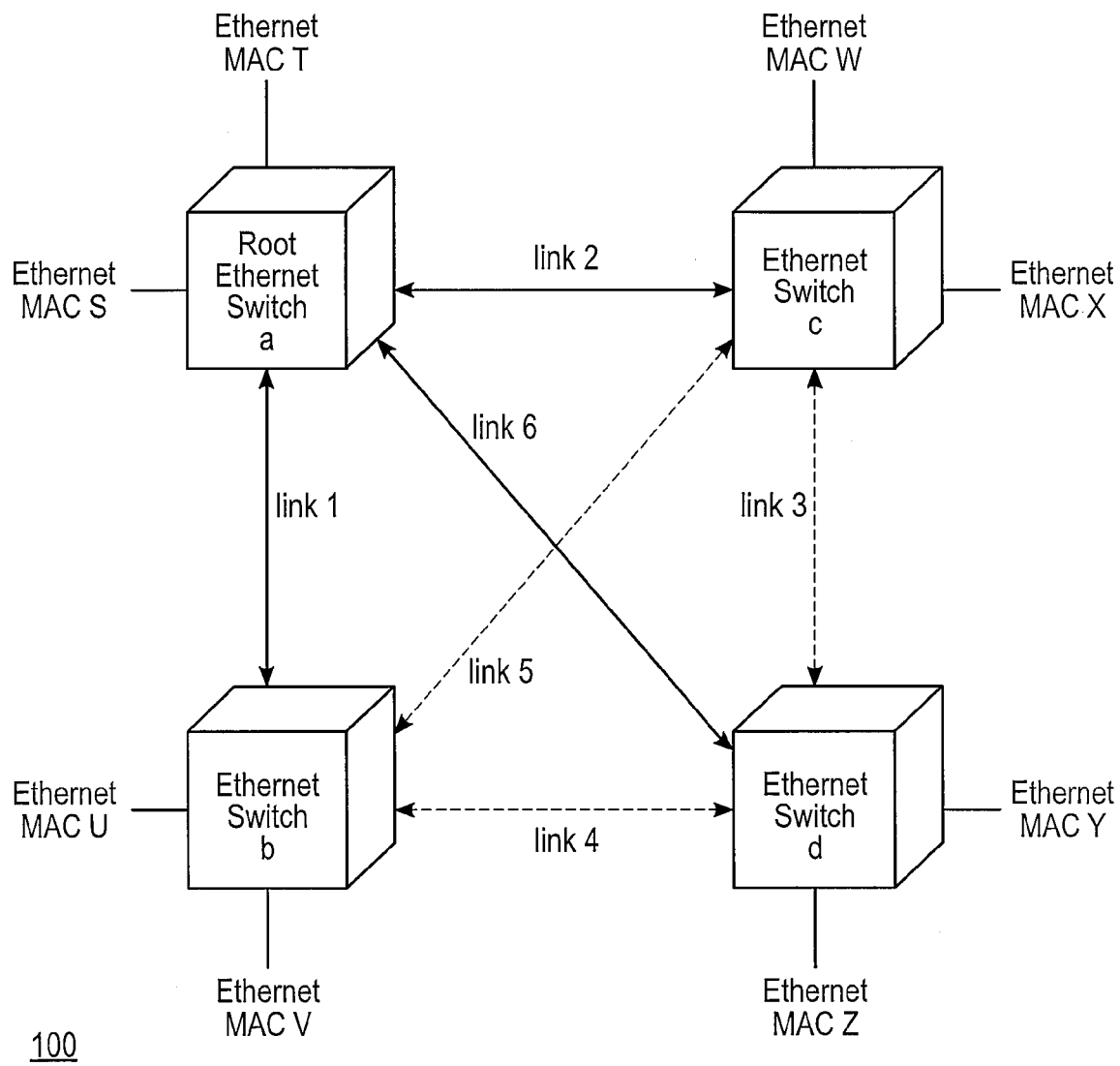
FIG. 1 shows a sample Ethernet network.

FIG. 1 shows a sample Ethernet network. As shown, the network 100 comprises four Ethernet switches a, b, c, and d. The switches are connected to each other by links 1 through 6. Coupled to each switch are two end nodes, identified by their Ethernet MAC (media access control) addresses. Specifically, switch a is coupled to the nodes with MAC addresses S and T. Switch b is coupled to the nodes with MAC addresses U and V. Switch c is coupled to the nodes with MAC addresses W and X, and switch d is coupled to the nodes with MAC addresses Y and Z.

In an Ethernet network, the path between each pair of nodes is determined using a spanning tree protocol (STP). The STP ensures that there is no more than one path between each pair of nodes so that the network 100 is "loop-free". If an STP is applied to the network 100 of FIG. 1 with switch a being designated as the root switch, then the link configuration shown in FIG. 1 may result, where links 1, 2, and 6 (shown in solid lines) are put into a forwarding state, and links 3, 4, and 5 (shown in dashed lines) are blocked. Because links 3, 4, and 5 are blocked, they cannot be used to carry traffic; thus, for example, switch c cannot send any information to switch d using link 3. Blocking some of the links in this manner enforces the requirement that there be one and only one path between each pair of nodes. The resulting tree structure composed of links 1, 2, and 6 allows all switches to forward packets to each other without encountering a forwarding loop.

Suppose now that one of the nodes (say the one with MAC address Z) wants to send an Ethernet packet to the node with MAC address U. To do so, it first sends the packet to switch d. Switch d looks into its forwarding table, and if it does not find MAC address U, it broadcasts the packet to its outgoing ports, in this case the port to link 6 and the port connected to the node with MAC address Y. Ethernet packets that arrive at nodes for which the MAC address does not match will be dropped; thus, the node with MAC address Y will drop the packet. Switch a then receives the packet and looks into its forwarding table for MAC address U. If it does not find MAC address U, it broadcasts the packet to its outgoing links, in this case links 1 and 2, and to both of its connected nodes. When the packet arrives at switch b, switch b looks into its forwarding table, and if it does not find MAC address U in the forwarding table, it broadcasts the packet to its outgoing links, in this case to the nodes with MAC address U and MAC address V. The node with MAC address U thus receives the packet. In this way, the node with MAC address Z is able to send an Ethernet packet to the node with MAC address U without the nodes or the intermediate switches knowing the forwarding path beforehand.

This broadcast or flooding mechanism, while effective, can cause unnecessary traffic over the switching links. Ethernet solves this problem by using reverse path learning to create a forwarding table association between MAC addresses and ports. In reverse path learning, the switches look at the source MAC address of the Ethernet packets that they receive, and populate their forwarding tables with the MAC address/received port associations. In the above example, when the node with MAC address U later sends a packet to the node with MAC address Z, all of the switches in the path (switch b, switch a and switch d) will have "learned" the association of the MAC address Z with the respective received port from the previous received Ethernet packet. Therefore, switch b will know to forward Ethernet packets with MAC address Z as the destination address on link 1 since that was the link on which it received Ethernet packets with MAC address Z as the source MAC address. Likewise, switch a will know to switch such packets to link 6. Similarly, switch d will know to forward such packets to the port connected to the node with MAC address Z. In this way, the network self-learns the reverse paths so that broadcast and flooding is performed in very few instances. The key ingredient to making reverse path learning possible is the fact that there is only one path between each pair of nodes.

Virtual Networks within Ethernet Networks

In an Ethernet network, it is possible to divide the network into one or more virtual networks (also referred to herein as virtual local area networks, or VLAN's). Doing so allows the network to be divided into multiple switching domains to limit the links on which packet broadcasts are performed. Virtual networks also allow nodes to be segregated so that only certain nodes are allowed to communicate with each other.

Figure 2:
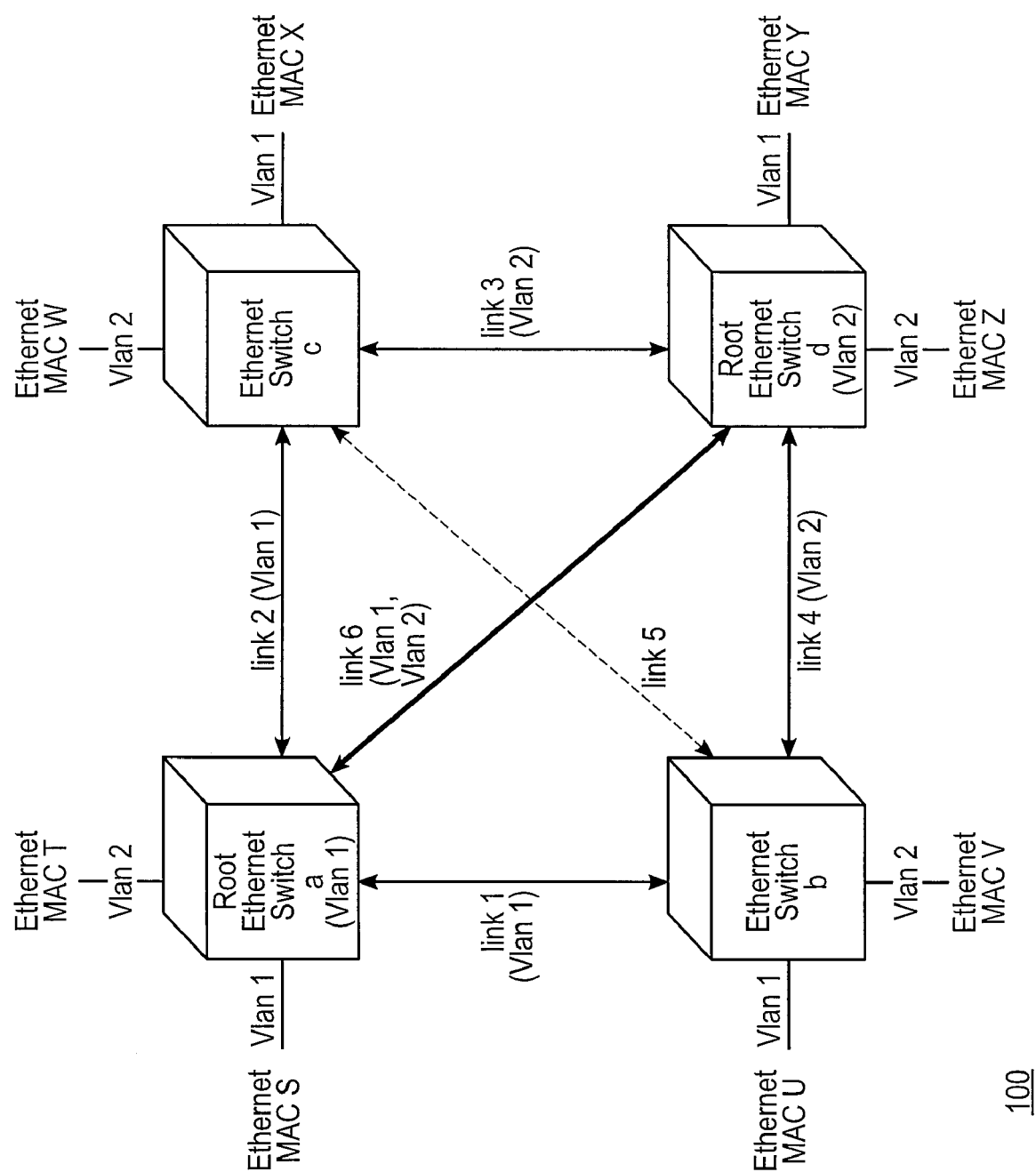
FIG. 2 shows the sample Ethernet network of FIG. 1 after it has been divided into two virtual networks.

FIG. 2 shows an example of the network 100 of FIG. 1 after it is has been divided into two VLAN's, VLAN 1 and VLAN 2. In this example, switch a is the STP root for VLAN 1 and switch d is the STP root for VLAN 2. In this example, VLAN 1 is configured in the same way as that described previously for FIG. 1, namely, links 1, 2 and 6 are placed in a forwarding state and links 3, 4 and 5 are blocked. For VLAN 2, links 2, 4, and 6 are placed in a forwarding state and links 1, 2, and 5 are blocked. Thus, in this configuration, link 5 is always blocked and link 6 carries traffic for both VLAN 1 and VLAN 2.

Each end node is associated with one of the VLAN's. Specifically, the nodes with MAC addresses S, U, X, and Y are on VLAN 1, and the nodes with MAC addresses T, V, W, and Z are on VLAN 2. Set up in this way, the nodes with MAC addresses S, U, X, and Y will be able to communicate with each other but not with the nodes with MAC addresses T, V, W, and Z. Similarly, the nodes with MAC addresses T, V, W, and Z will be able to communicate with each other but not with the nodes with MAC addresses S, U, X, and Y. In this way, the VLAN's separate the various nodes into different domains such that the nodes are treated as if they are in separate networks even though they are in the same physical network.

VLAN's also enable the broadcasting of packets to be limited to certain links. To illustrate this point, suppose that the node with MAC address W wishes to send an Ethernet packet on VLAN 2 to the node with MAC address V. To do so, it first sends the packet to switch c. Switch c looks into its forwarding table, and if it does not find MAC address V, it broadcasts the packet to its outgoing ports which support VLAN 2, in this case the port to link 3. It does not broadcast to link 2 or to the port coupled to the node with MAC address X since these ports support VLAN 1 only. Switch d then receives the packet and looks into its forwarding table for MAC address V. If it does not find MAC address V, it broadcasts the packet to its outgoing links that support VLAN 2, in this case links 4 and 6, and to the node with MAC address Z. When the packet arrives at switch b, switch b looks into its forwarding table, and if it does not find MAC address V in the forwarding table, it broadcasts the packet to its outgoing links that support VLAN 2, in this case to the node with MAC address V. In this way, the node with MAC address V receives the packet. With the use of a VLAN, the packet reaches the destination with broadcasts over a fewer number of links.

A point to note about VLAN's is that they in and of themselves are loop-free switching path, reverse path learning networks. Each VLAN provides one and only one path between each pair of nodes; thus, packet broadcast and reverse path learning can still be performed. Consequently, VLAN's implemented within an Ethernet network retain the advantages of Ethernet networks.

Multiple Switching Paths

VLAN's have primarily been used to segregate traffic within a network. It has been observed by Applicants, however, that VLAN's may also be used to provide multiple paths between node pairs. For example, if all of the nodes in FIG. 2 are associated with both VLAN 1 and VLAN 2, then various nodes would have two possible paths to various other nodes. For example, the node with MAC address Y would have two paths to the node with MAC address V. Using VLAN 1, the path would be from switch d to link 6 to switch a to link 1 to switch b. Using VLAN 2, the path would be from switch d to link 4 to switch b. Thus, by setting up multiple VLAN's, and by associating nodes with multiple VLAN's, it is possible to provide multiple paths between each pair of nodes. These multiple paths will enable load balancing to be performed, fault tolerance to be enhanced, and switching capacity to be more fully utilized. As an additional point, these benefits can be realized without losing the advantages of a loop-free switching path, reverse path learning network. As noted above, VLAN's do not violate any of the fundamentals of a loop-free switching path, reverse path learning network. Thus, by setting up multiple VLAN's, and by associating nodes with multiple VLAN's, it is possible to provide multiple paths between node pairs, even in a loop-free switching path, reverse path learning network, such as an Ethernet network.

Sample Multi-Path Network

Figure 3:
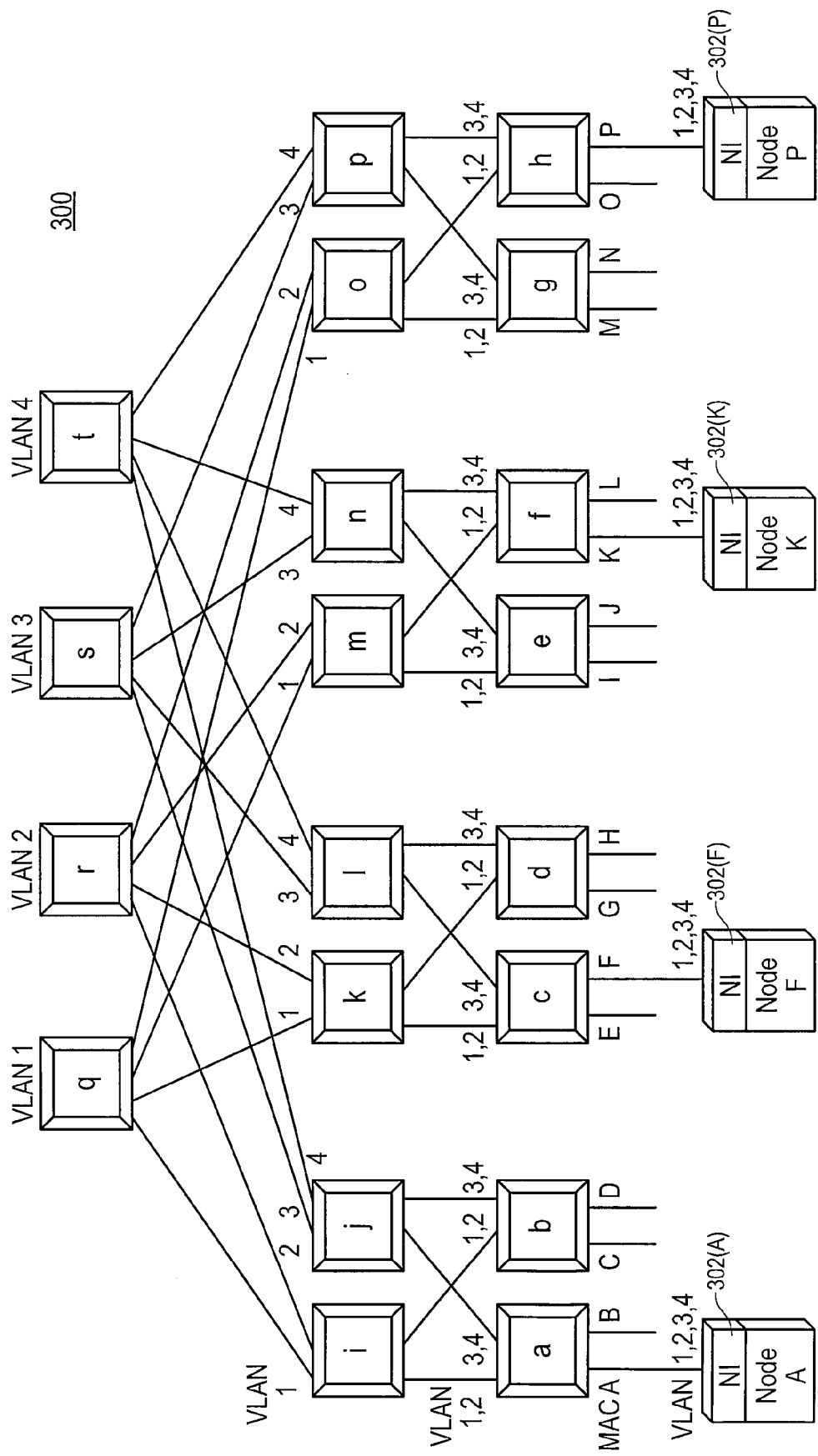
FIG. 3 shows a sample loop-free switching path, reverse path learning network in which multiple virtual networks have been established to provide multiple paths between each pair of nodes.

FIG. 3 shows an example of a loop-free switching path, reverse path learning network 300 in which multiple VLAN's have been established to provide multiple paths between each pair of nodes. Specifically, in network 300, there are four VLAN's (VLAN's 1 through 4); thus, there are four possible paths between each pair of nodes.

In FIG. 3, the components labeled with lower case letters are switches, and the components identified with capital letters are nodes. For the sake of convenience, the same capital letter is used to identify both a node and its MAC address. Thus, node A has MAC address A, node F has MAC address F, and so forth. For the sake of simplicity, only some of the nodes in the network 300 are shown. Each link has one or more numbers placed next to it. This number indicates the VLAN that is supported on that link. For example, the link between switch a and switch j has the label "3,4". This means that the link supports VLAN's 3 and 4. Given this labeling system, it can be seen that each of the links going to and from a node supports all four VLAN's. Thus, each node can use and can be reached via any of the four VLAN's.

In network 300, switch q is the root switch for VLAN 1, switch r is the root switch for VLAN 2, switch s is the root switch for VLAN 3, and switch t is the root switch for VLAN 4. Applying an STP to network 300 using each of the above switches as root switches will cause four spanning trees to be produced. Each spanning tree will represent one of the VLAN's, and each spanning tree will specify the loop-free paths between all of the nodes. The topology shown in FIG. 3 may be the result of this process. To enforce the spanning trees, the various switches may be configured, either manually or by an automated network manager (not shown), to associate each link with one or more VLAN's. For example, switches a and j may be configured to associate the link between them with VLAN's 3 and 4. By configuring the switches in this way, each switch will know which links can be used with which VLAN or VLAN's. In one embodiment, each spanning tree and hence, each VLAN, provides a different path from a source node to a destination node. For example, on VLAN 1, the path from node A to node K would be from switch a to switch i to switch q to switch m to switch f. On VLAN 4, the path from node A to node K would be from switch a to switch j to switch t to switch n to switch f. By choosing different VLAN's, packets can be sent from a source node to a destination node along different paths.

Figure 4A:
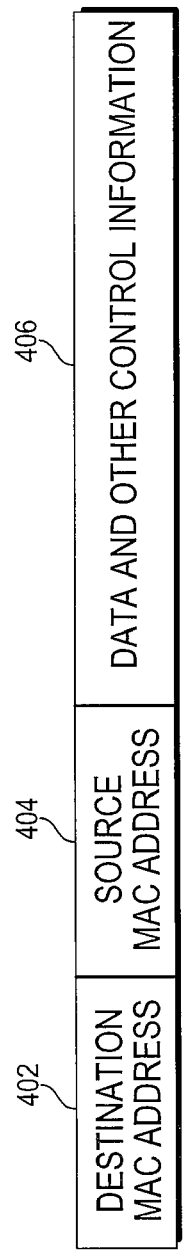
FIG. 4a shows a sample Ethernet packet before path-selection virtual network information is added.
Figure 4B:
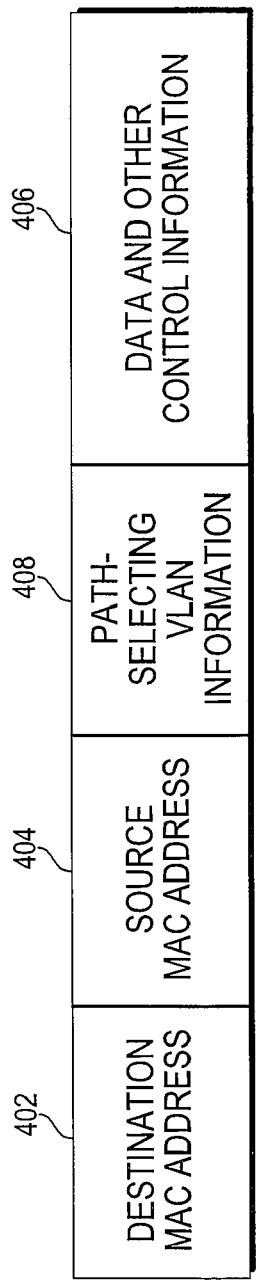
FIG. 4b shows the Ethernet packet of FIG. 4a after path-selection virtual network information has been added.

To enable an Ethernet packet to be properly switched according to VLAN's, some information is added to each packet. FIG. 4*a* shows a standard Ethernet packet comprising a destination MAC address 402, a source MAC address 404, and data and other control information 406. In one embodiment, to VLAN enable a packet, a set of path-selecting VLAN information 408 is inserted into the packet between the source MAC address 404 and the data and other control information 406, as shown in FIG. 4*b*. The VLAN information 408 may include information (e.g. a VLAN ID) indicating which VLAN is to be used to switch the packet, as well as any other information (e.g. control information) needed by the switches to switch the packet properly. The VLAN information 408 enables the switches to determine the correct VLAN, and hence, the correct path to take to switch the packet to the destination node. In one embodiment, the path-selecting VLAN information 408 is removed from the packet when the packet is received. Thus, by the time the destination node gets the packet, the VLAN information 408 will no longer be there. As a result, the destination node can remain unaware that the path-selecting VLAN information 408 was ever in the packet. This in turn enables the path-selection to be carried out without changing any networking protocols implemented by the source and destinations nodes.

Figure 4C:
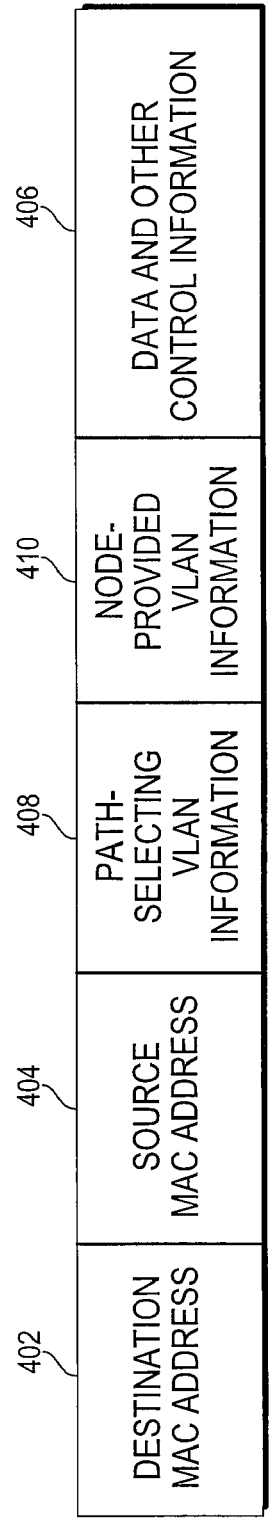
FIG. 4c shows a sample Ethernet packet that contains both path-selection virtual network information and node-provided virtual network information.

In some implementations, the source and destination nodes may already be implementing VLAN's (for example, for segregation purposes). Thus, an Ethernet packet may already contain a set of VLAN information. Even in such a case, a set of path-selecting VLAN information may still be added to the Ethernet packet. This is shown in FIG. 4*c*, where the path-selecting VLAN information 408 is inserted into the packet between the source MAC address 404 and the node-provided VLAN information 410. In this case, it will be the path-selecting VLAN information 408, not the node-provided VLAN information 410, that will be used by the switches to switch the packet through the network 300 to the destination node. As this example shows, path selection can be implemented even with packets that already contain node-provided VLAN information.

To show that the network 300 of FIG. 3 still behaves like a loop-free switching path, reverse path learning network, reference will now be made to an example. Suppose that node A wishes to send an Ethernet packet to Node P. Suppose further that VLAN 1 is to be used; thus, the packet is updated with information indicating VLAN 1 as the VLAN of choice. Suppose further that the switches in the path have not yet learned the MAC address/switch port association. In such a case, when the packet is sent to switch a, switch a will broadcast the packet to all of its outgoing ports on which VLAN 1 is enabled. These ports include the port attached to MAC address B and the port labeled VLAN 1,2. The port labeled 3,4 is not part of VLAN 1 and therefore would be blocked for the broadcast of this packet. The packet is sent to switch i, which in turn, broadcasts the packet onto those ports which are part of VLAN 1. In this case, these would be the link labeled 1,2 which connects switch i to switch b, and the link labeled VLAN 1, which connects switch i to switch q. Switch b broadcasts the packet to the ports attached to MAC addresses C and D but not to switch j. Switch q broadcasts the packet to switches k, m and o. Switch k broadcasts the packet to switches c and d but not to switch r since that link is only enabled for VLAN 2. Likewise, switch m broadcasts the packet to switches e and f and not to switch r, and switch o broadcasts the packet to switches g and k and not to switch r. Switch c forwards the packet to the ports connected to MAC addresses E and F, switch d forwards to ports connected to MAC addresses G and H, switch e forwards to ports connected to MAC addresses I and J, switch f forwards to ports connected to MAC addresses K and L, switch g forwards to ports connected to MAC addresses M and N, and switch h forwards to ports connected to MAC addresses O and P. Node P thus receives the packet. Note that because of the tree structure on which VLAN 1 is defined, there are no loops in the switching topology; hence, there is only one path between each pair of end nodes for which VLAN 1 is enabled. This example demonstrates how an Ethernet packet in network 300 can reach its destination without apriori knowledge of the switching path, and is consistent with how Ethernet typically performs flooding.

As each switch switches the packet, it is also carrying out reverse path learning. Thus, each switch (switches h, o, q, i, a) along the path populates its forwarding tables with an association between source MAC address A, VLAN 1, and the port on which the packet was received. That way, when node P sends an Ethernet packet destined for node A on VLAN 1, the switches will already know how to switch that packet. Namely, the packet will be forwarded from node P to switch h then to switch o over the link marked 1,2 to switch q over the link marked 1 to switch i over the link marked 1 to switch a over the link marked VLAN 1,2 to the port connected to MAC address A, which is Node A. No flooding or broadcasting is necessary. As illustrated by this example, the reverse path learning for a VLAN-based multi-path switching topology is just an extension (e.g. taking the VLAN into account) of the reverse path learning methodology carried out for non-VLAN based switching topology.

Continuing the example, assume that node P wants to send an Ethernet packet to node A, but this time over VLAN 4. Further assume that the switches have populated their forwarding tables via reverse path learning from a previous Ethernet packet sent from node A to node P over VLAN 4. The Ethernet packet with VLAN 4 and destination MAC address A will be forwarded from node P to switch h then to switch p over the link marked 3,4 to switch t over the link marked 4 to switch j over the link marked 4 to switch a over the link marked 3,4 to the port connected to node A.

With the multiple VLAN's defined between each pair of nodes, any node can send an Ethernet packet to another node using one of the four VLAN's, and hence, one of the four switching paths through the switching topology. The ability to use the four switching paths between each pair of nodes effectively increases the cross section switching capacity of the network. In the example above, there are four VLAN paths defined so there is an increase by a factor of four to the cross section switching capacity. This use of different VLAN based switching paths also serves to distribute the traffic over multiple links, thereby effectively balancing the traffic within the switching network.

Network Interface

As shown in FIG. 3, each node is coupled to the network 300 through a corresponding network interface 302. Basically, the network interface 302 interfaces the node with the network 300 to enable the node to send and receive sets of information (e.g. packets). In one embodiment, it is the network interface 302 that selects which VLAN to use to transport a set of information to a destination node. This will be discussed in greater detail in a later section.

For purposes of the present invention, a network interface 302 may take on any desired form and its functionality may be implemented in any desired manner. For example, a network interface 302 may be a physical interface (e.g. a network interface card) that is coupled to but is separate from the node. As an alternative, a network interface 302 may be a physical component that is part of the node (e.g. integrated into the node's motherboard, integrated into the node's processor or processors, etc.). As a further alternative, a network interface 302 may be a logical component (e.g. a computer program) that resides and runs on the node. These and other embodiments are within the scope of the present invention. In any embodiment, the functionality of the network interface 302 may be realized using hardware (e.g. hardware logic components, ASIC's, etc.), software (e.g. having one or more processors execute one or more sets of instructions), or a combination of both.

For purposes of the present invention, a node may be any component that communicates on the network. In one embodiment, a node comprises one or more processors, and executes an operating system and one or more applications. In such a node, the applications and operating system may perform some networking functions, such as preparing sets of information (e.g. packets) for sending into the network, implementing network protocols, determining destinations nodes, etc. However, in one embodiment, the operating system and the applications do not participate in the selection of the VLAN, and hence, the selection of the path to be taken to transport a set of information to a destination node. In fact, the operating system and applications do not even need to be aware of the multiple VLAN's. Rather, in one embodiment, selection of the VLAN to use in transporting a set of information is the responsibility of the network interface 302. By delegating this responsibility to the network interface 302, it is possible to shield the operating system and applications from the complexities of the network. As a result, it is possible to implement the methodology of the present invention without modifying any existing operating systems and applications.

Figure 5:
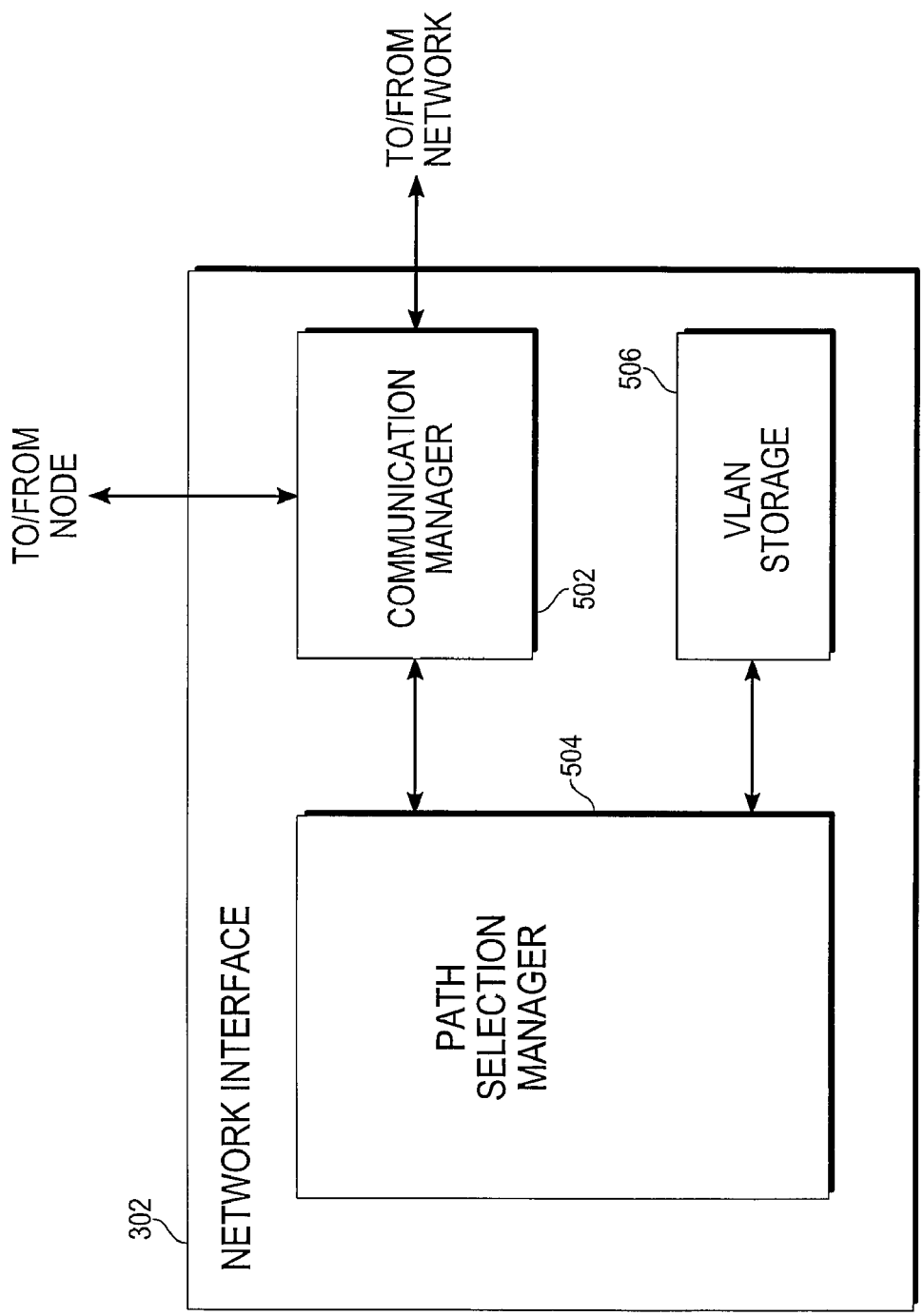
FIG. 5 is a functional block diagram of a network interface, in accordance with one embodiment of the present invention.

FIG. 5 shows a functional block diagram of a network interface 302 in accordance with one embodiment of the present invention. As shown, the network interface 302 comprises a communication manager 502, a path selection manager 504, and a VLAN storage 506. Generally, the communication manager 502 is responsible for sending and receiving communications to and from its corresponding node and the network. The path selection manager 504 is responsible for selecting a VLAN, and hence, a path for outgoing sets of information. The VLAN storage 506 is used to store information pertaining to the one or more VLAN's that can be used to transport a set of information from the corresponding node to a destination node. The functions performed by these components will be elaborated upon in the following discussion.

Sample Network Interface Operation

Figure 6:
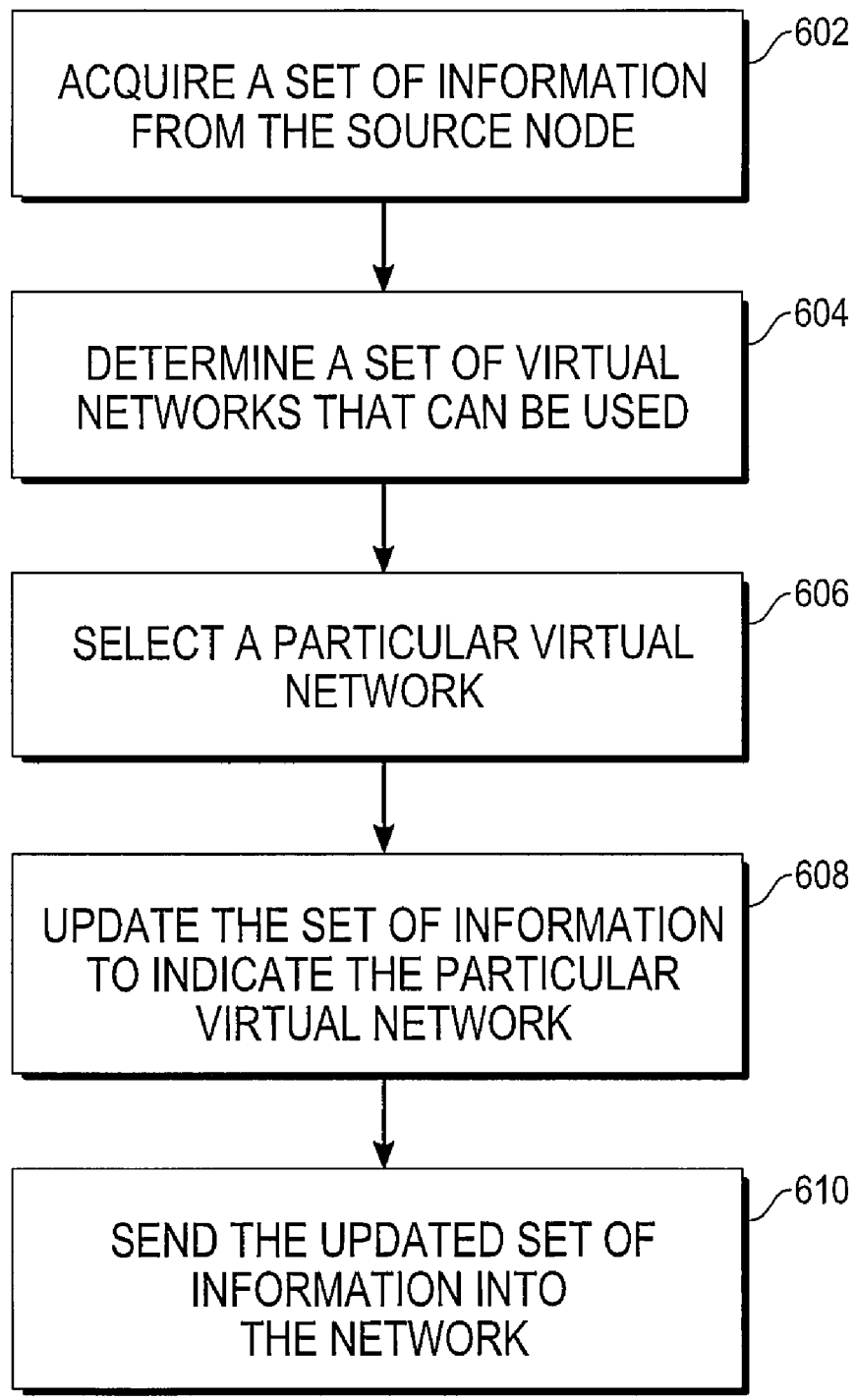
FIG. 6 is a flow diagram illustrating the operation of a network interface in accordance with one embodiment of the present invention.

FIG. 6 shows a flow diagram which illustrates the manner in which a network interface 302 operates in accordance with one embodiment of the present invention. Before the operations shown in FIG. 6 are performed, a network, such as network 300 in FIG. 3, is first configured. The network 300 may be configured by a network administrator by selecting the four switches q, r, s, and t as the root switches for their respective VLAN's, and then running an STP for each root switch. This will produce a spanning tree for each VLAN, which defines the paths between all of the node pairs in the VLAN. After the four spanning trees are derived, the switches are configured such that they recognize which links support which VLAN's, in accordance with the derived spanning trees. Once that is done, each of the network interfaces 302 is informed of the VLAN's that it can use to transport information from a source node to a destination node. In network 300, the usable VLAN's are VLAN's 1, 2, 3, and 4. This set of VLAN's is stored by each network interface 302 in its VLAN storage 506 (FIG. 5). With the network 300 thus configured, the network interfaces 302 are ready to facilitate communication by their respective nodes. In the following discussion, it will be assumed for the sake of example that node A is the source node, node P is the destination node, and network interface 302(A) is the interface whose operation is being described.

To send a set of information (e.g. an Ethernet packet) from node A to node P, network interface 302(A), and more specifically, the communication manager 502 on network interface 302(A), acquires (block 602 of FIG. 6) a set of information from node A. Network interface 302(A) may acquire this set of information in any number of ways. For example, node A may simply provide the set of information to network interface 302(A). Node A may also provide a reference or a pointer to the set of information, which the network interface 302(A) would use to access the set of information. Network interface 302(A) may also acquire the set of information in other ways.

In one embodiment, the set of information specifies an address for the destination node or comprises information from which the address of the destination node may be derived. For example, the set of information may actually include the address for node P. Alternatively, the set of information may include some other information (such as a memory location) from which the address for node P can be derived. In such a case, the communication manager 502 on network interface 302(A) derives the address for node P. As a further alternative, the set of information may comprise other information that can be used to derive the address of node P.

Network interface 302(A), and more specifically, the path selection manager 504 on network interface 302(A), determines (block 604) a set of virtual networks that can be used to transport the set of information to node P. As discussed above, at the time the network 300 is configured, each network interface 302 is informed of and stores the set of VLAN's (in its VLAN storage 506) that it can use to transport sets of information. Thus, network interface 302(A) accesses and consults this information, and determines that, in the current example, it can use VLAN's 1, 2, 3, and 4.

Thereafter, network interface 302(A), and more specifically, the path selection manager 504 on network interface 302(A), selects (block 606) one of the VLAN's to use to transport the set of information. For the sake of example, it will be assumed VLAN 1 is selected. In one embodiment, this selection is made after the address of the destination node is specified or derived. Also, in one embodiment, this selection is made in a manner that tends to balance the traffic load across the multiple VLAN's. For example, the network interface 302(A) may select the VLAN randomly (if the selection process is truly random, this should spread traffic across the various VLAN's relatively evenly). The network interface 302(A) may also select the VLAN in a round-robin fashion. Furthermore, the network interface 302(A) may select the VLAN based upon current traffic conditions. For example, the network interface 302(A) may select the VLAN with the path that is currently experiencing the lowest traffic load, or the VLAN with the path that currently has the most available capacity for carrying traffic. Information on current traffic conditions may be provided to the path selection manager 504 of network interface 302(A) by a central traffic monitoring component (not shown) or may be derived based upon information gathered by the path selection manager 504 of network interface 302(A). Based upon this information, network interface 302(A) can select the VLAN in such a manner as to balance the traffic load across the multiple paths. Load balancing is thus achieved.

After the VLAN (VLAN 1 in the current example) is selected, the network interface 302(A), and more specifically, the path selection manager 504 of network interface 302(A), updates (block 608) the set of information to include information indicating the particular VLAN that was selected. In one embodiment, this may be done as shown in FIGS. 4b and 4c, wherein the path selecting VLAN information 408 is inserted into the set of information. After the set of information is updated, it is sent (block 610) by the network interface 302(A), and more specifically, by the communication manager 502 of network interface 302(A), into the network 300. The switches in the network 300 then use the address and VLAN information in the set of information to switch the set of information to node P along VLAN 1.

On the receiving end, the network interface 302(P), and more specifically, the communication manager 502 on network interface 302(P), receives the set of information, and removes the path-selecting VLAN information 408 therefrom. The network interface 302(P) then passes the set of information to node P for processing. The set of information is thus delivered from node A to node P.

In one embodiment, the network interface 302(A) processes every set of information destined for node P in this way. Thus, network interface 302(A) may acquire another set of information from node A that is destined for node P. For this set of information, network interface 302(A) would perform the same operations as that shown in FIG. 5. However, the network interface 302(A) may select a different VLAN (VLAN 2, for example) for this set of information. In general, the network interface 302(A) may acquire a series of information sets from node A that are destined for node P, and may select different VLAN's for different information sets. By doing so, the network interface 302(A) distributes the traffic across the multiple VLAN's, and hence, the multiple paths. If each network interface 302 does this, then load balancing can be achieved throughout the network 300. In this manner, load balancing is implemented on a dynamic, packet by packet basis.

Alternative Embodiment

Figure 7:
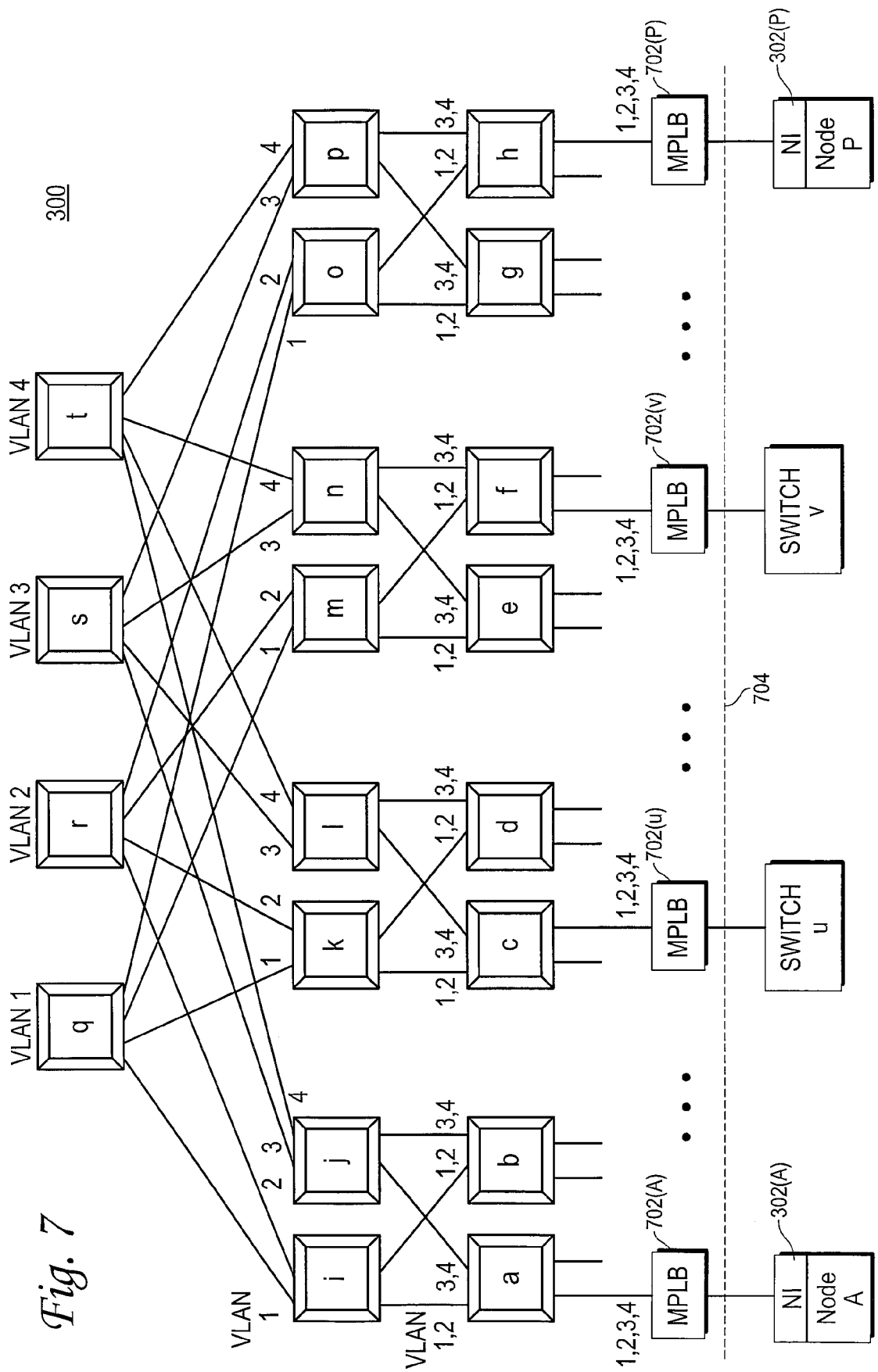
FIG. 7 shows a multi-path load balancing (MPLB) component implemented in the sample network of FIG. 3, in accordance with one embodiment of the present invention.

Thus far, the path selection and load balancing functions have been described as being implemented by the network interface 302. While this is an advantageous embodiment, it is not the only one. As an alternative, the path selection and load balancing functions may be implemented by a multi-path load balancing (MPLB) component that is separate from the network interface 302. Such a component deployed in the network 300 of FIG. 3 is shown in FIG. 7. As shown, an MPLB 702 may be deployed between the network interface 302 of a node (e.g. network interface 302(A) of node A) and one of the switches (e.g. switch a) of the network 300. One of the advantages of this arrangement is that it relieves the network interface 302 of all path selection and load balancing responsibilities. Thus, any standard network interface 302 may be used to couple a node to the network 300. An MPLB 702 may also be used to couple other non-node components to the network 300. These non-node components may be switches (e.g. switch u, switch v), routers, or any other type of network component.

In one embodiment, the MPLB's 702 are implemented at the edge of the network 300. More specifically, an MPLB 702 is coupled to each of the edge links of the network 300. In network 300, the switches a through h are on the edge of the network 300, and each of these switches has two edge links that allow external components to couple to the network 300. In such a network 300, an MPLB 702 would be coupled to each of these edge links. Implemented in this way, the MPLB's 702 act as the border of the network 300. Everything above the dashed line 704 is considered internal to the network 300. Everything below the dashed line 704 is considered external to the network 300. The significance of this internal/external distinction is that components external to the network 300 need not be aware of the multiple VLAN's implemented within the network 300. Hence, none of the external components (e.g. node A, node P, switch u, switch v) need to perform any path selection or load balancing functions. Instead, it is up to the MPLB's 702 to perform these functions. When a set of information (e.g. a packet) from an external component enters the network 300, it is up to the MPLB 702 to (when appropriate) select a VLAN, and hence, a path, to use to switch the packet through the network 300. As discussed previously in connection with the network interface 302, this may involve inserting a set of path-selecting VLAN information into the packet. When a packet leaves the network 300 to go to an external component, it is up to the MPLB 702 to remove any path-selecting VLAN information from the packet before sending it on. By doing so, the MPLB 702 makes the path selection and load balancing details completely transparent to the external components.

In the implementation where the path selection and load balancing functions are performed by a network interface 302, it is known that the network interface 302 is coupled to a node. Because of this, certain assumptions can be made as to the types of packets that the network interface 302 will be handling. In the implementation where the path selection and load balancing functions are performed by an MPLB 702, however, such assumptions cannot be made because an MPLB 702 may be coupled not just to a node but also to any other type of network component. As a result, an MPLB 702 needs to know how to handle more types of packets than a network interface 302. For some types of packets, it may not be appropriate to implement a path selection or load balancing function. For other types of packets, some additional processing may be needed. Because of this variety, the MPLB 702 needs to be endowed with additional capability to handle more types of packets. The handling of different packet types will be discussed in greater detail in later sections.

As noted above, an MPLB 702, in one embodiment, is deployed at the border of the network 300. As a result, an MPLB 702 behaves as an access point to the network 300 for external components. This access point function is typically performed by an edge port of an edge switch (for example, if MPLB 702(u) were not deployed, the access point function would be performed by the edge ports of edge switch c). Because an MPLB 702 is now taking on the access point function of an edge port, the MPLB 702, in one embodiment, performs the functions that are typically performed by an edge port. This is in addition to the path selection and load balancing functions noted above.

Multi-Path Load Balancing Component

Figure 8:
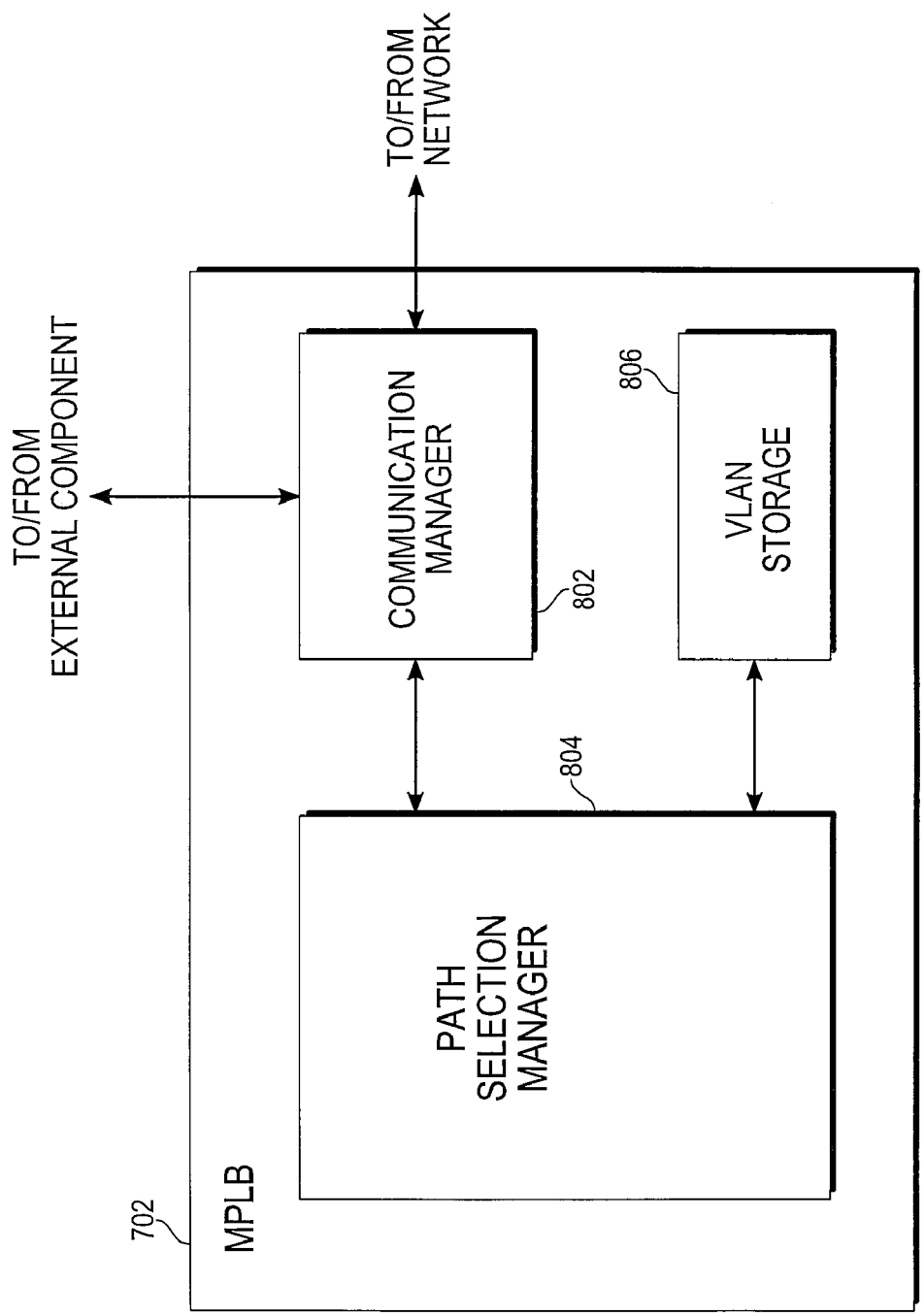
FIG. 8 is a functional block diagram of an MPLB, in accordance with one embodiment of the present invention.

FIG. 8 shows a functional block diagram of an MPLB 702 in accordance with one embodiment of the present invention. For the most part, the MPLB 702 comprises the same general components as the network interface 302 of FIG. 5. These components include a communication manager 802, a path selection manager 804, and a VLAN storage 806. Generally, the path selection manager 804 is responsible for selecting a VLAN, and hence, a path, to use to switch a set of information through the network 300. The VLAN storage 806 is used to store information pertaining to the one or more active VLAN's that can be used to switch a set of information through the network. The VLAN storage 806 may be populated with VLAN information in the same manner as the VLAN storage 506 of the network interface 302 is populated with VLAN information. The communication manager 802 is responsible for interfacing an external component with the network 300. Unlike the communication manager 502 of network interface 302, this communication manager 802 may be coupled not just to a node but to any other type of network component. Because of this, the communication manager 802 may receive various types of packets (the terms "packet" and "set of information" are used interchangeably hereinafter). In one embodiment, additional functionality is imparted to the communication manager 802 to enable it to handle various different types of packets. In addition, in one embodiment, the communication manager 802 is endowed with additional functionality to enable it to perform the functions typically performed by an edge port. The operation of these components will be elaborated upon in later sections. As was the case with the network interface 302, for purposes of the present invention, the functionality of the MPLB 702 may be realized using hardware (e.g. hardware logic components, ASIC's, etc.), software (e.g. having one or more processors execute one or more sets of instructions), or a combination thereof.

Operational Overview

Figure 9:
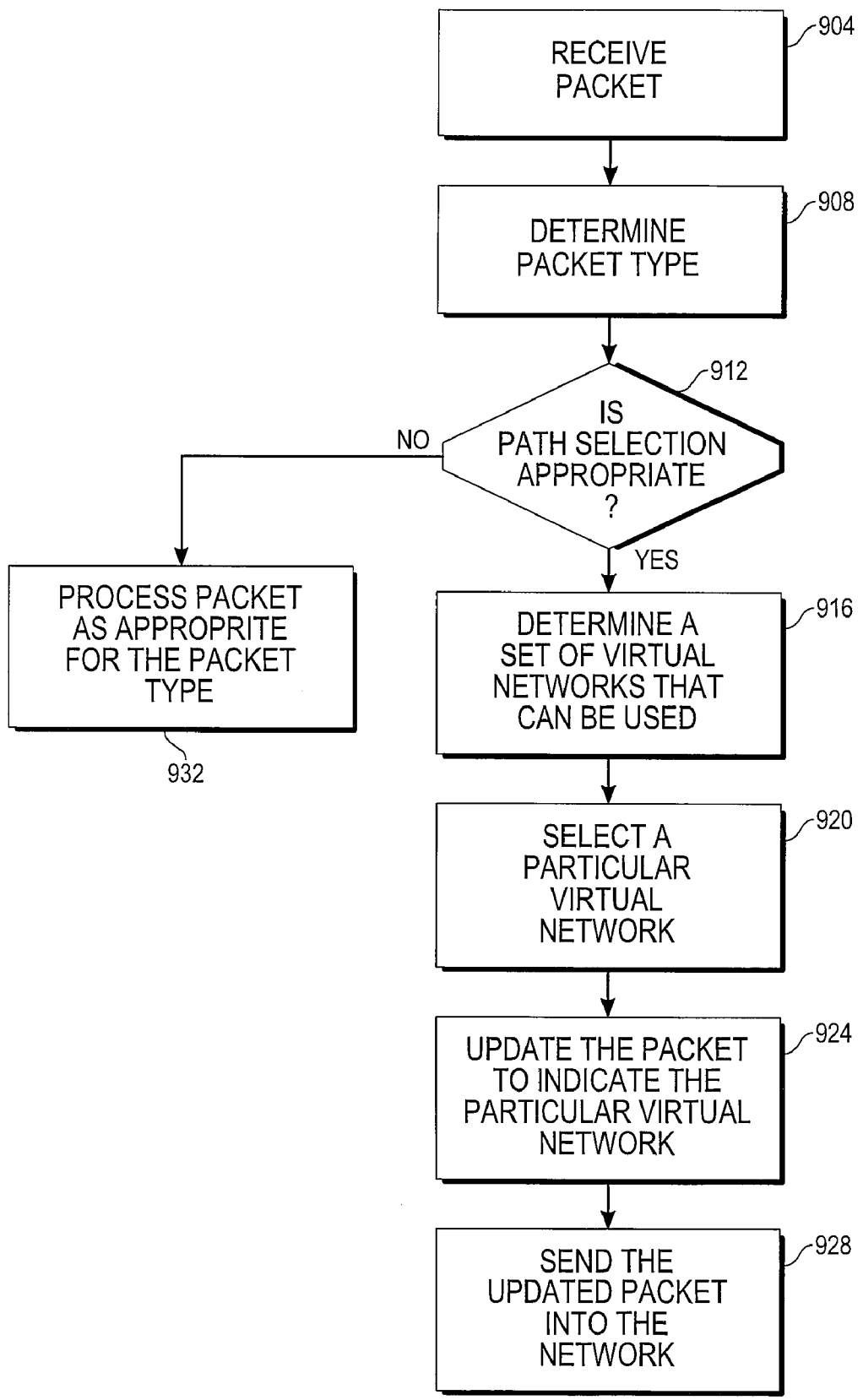
FIG. 9 is a flow diagram illustrating the operation of an MPLB in accordance with one embodiment of the present invention.

Each MPLB 702 may be used for ingress (to forward one or more packets from an external component into the network 300) or egress (to forward one or more packets from the network 300 out to an external component). FIG. 9 shows a high level operational flow diagram for the ingress functionality of an MPLB 702, in accordance with one embodiment of the present invention. The following discussion assumes that the network 300 has already been configured and that the VLAN'S 1, 2, 3, 4 have already been established in the manner described previously.

In operation, an MPLB 702, and more specifically, the communication manager 802 on the MPLB 702, receives (block 904) a packet from an external component. This packet may be received from a node, a switch, or any other type of external network component. In response, the communication manager 802 determines (block 908) a packet type for the packet. This determination may be made, for example, based upon the control information and data in the packet. Once the packet type is determined, the communication manager 802 further determines (block 912) whether path selection is appropriate for this type of packet. If it is not, then the communication manager 802 proceeds to process (block 932) the packet in a manner that is appropriate for that packet type. On the other hand, if path selection is appropriate for this type of packet, then the MPLB 702, and more specifically, the path selection manager 804 of the MPLB 702, proceeds to select a path to use to transport the packet through the network 300.

In one embodiment, the path selection manager 804 selects a path by first determining (block 916) a set of virtual networks that it can use to transport the packet through the network 300. In one embodiment, the path selection manager 804 makes this determination by accessing and consulting the information stored in the VLAN storage 806, which sets forth all of the active VLAN's within network 300. In the current example, the active VLAN's are VLAN's 1, 2, 3, and 4. Given this information, the path selection manager 804 selects (block 920) one of the VLAN's to use to transport the packet. By selecting a VLAN, the path section manager 804 in effect selects a path (since each VLAN defines a different path through the network 300).

In one embodiment, this selection is made in a manner that tends to balance the traffic load across the multiple VLAN's. For example, the path selection manager 804 may select the VLAN randomly (if the selection process is truly random, this should spread traffic across the various VLAN's relatively evenly). The path selection manager 804 may also select the VLAN in a round-robin fashion. Furthermore, the path selection manager 804 may select the VLAN based upon current traffic conditions. For example, the path selection manager 804 may select the VLAN with the path that is currently experiencing the lowest traffic load, or the VLAN with the path that currently has the most available capacity for carrying traffic. The path selection manager 804 may also select the VLAN with the path that has the lowest current latency. Information on current traffic conditions may be provided to the path selection manager 804 by a central traffic monitoring component (not shown) or may be derived based upon information gathered by the path selection manager 804. Based upon this information, the path selection manager 804 can select the VLAN in such a manner as to balance the traffic load across the multiple paths. Load balancing is thus achieved.

After the VLAN is selected, the path selection manager 804 updates (block 924) the packet to include information indicating the particular VLAN that was selected. In one embodiment, this may be done as shown in FIGS. 4b and 4c, wherein the path selecting VLAN information 408 is inserted into the packet. After the packet is updated, it is sent (block 928) by the MPLB 702, and more specifically, by the communication manager 802 of the MPLB 702, into the network 300. The switches in the network 300 thereafter use the VLAN information in the packet to switch the packet through the network 300 along the selected path.

The above discussion provides a high level description of the operation of the MPLB 702. To illustrate how the MPLB 702 handles specific types of packets, reference will now be made to several specific examples.

TCP/IP and UDP/IP Packets

Suppose that an MPLB 702, and more specifically, the communication manager 802 of the MPLB 702, receives a TCP/IP or a UDP/IP packet from an external component. This packet may be received from a node coupled to the MPLB 702, from an external switch that has forwarded the packet to the MPLB 702, or from some other external network component. In addition to data, this type of packet comprises header information. The header information includes an Ethernet portion, which includes a source MAC address, a destination MAC address, and a type (which would be IP in this case). The header information further comprises a source IP address, a destination IP address, a protocol type (which would be either TCP or UDP), a TCP or UDP source port number, and a TCP or UDP destination port number. Upon receiving the packet, the communication manager 802 extracts the header information therefrom, and uses the header information to determine the packet type. From the header information described above, the communication manager 802 determines that this packet is of the TCP/IP or UDP/IP type. In one embodiment, path selection is appropriate for this type of packet. Therefore, the communication manager 802 invokes the path selection manager 804 to select a path through the network 300 for this packet.

In response to being invoked, the path selection manager 804 accesses the VLAN storage 806 and uses the VLAN information contained therein to determine a set of VLAN's that can be used to transport the packet through the network 300. After the available VLAN's are determined, the path selection manager 804 selects one of the VLAN's. By selecting a VLAN, the path section manager 804 in effect selects a path through the network 300. In one embodiment, this VLAN selection is made in a manner that tends to balance the traffic load across the multiple VLAN's.

After the VLAN is selected, the path selection manager 804 updates the packet to include information indicating the particular VLAN that was selected. In one embodiment, this may be done as shown in FIGS. 4*b* and 4*c*, wherein the path selecting VLAN information 408 is inserted into the packet. After the packet is updated, it is sent by the communication manager 802 into the network 300. The switches in the network 300 thereafter use the address and VLAN information in the packet to switch the packet through the network 300. In this manner, the MPLB 702 implements path selection and load balancing on a TCP/IP or UDP/IP type of packet.

In the above example, the path selection manager 804 performs path selection on a packet-by-packet basis. In some implementations, it may be desirable to group certain packets together into a flow, and to use the same VLAN (and hence, the same path) for all of the packets in that flow. To accommodate such an implementation, the path selection manager 804, in one embodiment, may process the TCP/IP or UDP/IP packet as follows.

Before selecting a VLAN from the available VLAN's specified in the VLAN storage 806, the path selection manager 804 derives a flow label for the packet. The flow label may be derived, for example, by processing the header information in the packet through a hashing algorithm and deriving a hash code therefrom. This hash code semi-uniquely or uniquely identifies the flow of which the packet is a part. Once the flow label is derived, the path selection manager 804 determines whether other packets having this flow label have been processed before. In one embodiment, to make this determination, the path selection manager 804 determines whether there is an already existing flow data structure associated with this flow label.

If such a data structure already exists (thereby, indicating that packets associated with this flow were previously processed), then the path selection manager 804 accesses that data structure, and extracts therefrom a VLAN ID. This VLAN ID indicates the VLAN that was selected for the previously processed packets in the flow. After the VLAN ID is extracted, it is compared against the available VLAN's specified in the VLAN storage 806. If this VLAN is still available, it is selected as the VLAN to be used for this packet. If it is no longer available, then another VLAN is selected from the list of available VLAN's, and that VLAN ID is stored into the flow data structure. That VLAN will be used for this packet and for future packets of the flow.

If there is no currently existing flow data structure associated with the derived flow label, then the path selection manager 804 creates a new flow data structure, and associates the flow label with that new data structure. In addition, the path selection manager 804 selects one of the available VLAN's specified in the VLAN storage 806, and stores that VLAN ID into the new flow data structure. By doing so, the path selection manager 804 associates the selected VLAN with the flow. This will cause this packet and future packets of the flow to use the selected VLAN. In this manner, the path selection manager 804 can cause all of the packets of a flow to use the same VLAN. By using different VLAN's for different flows, the path selection manager 804 can load balance across the multiple VLAN's.

Topology Control Packets

As shown in FIG. 7, an MPLB 702 may be coupled to an external switch, such as switch u or v. One of the consequences of being coupled to a switch is that the MPLB 702 may receive some of the topology control packets sent by that switch. In one embodiment, the MPLB 702, and more specifically, the communication manager 802 of the MPLB 702, knows how to recognize and handle these topology control packets.

Spanning Tree BDPU

One type of topology control packet that may be sent by a switch is a spanning tree bridge protocol data unit (spanning tree BPDU) packet. This type of packet is directed to well known and specific MAC addresses (i.e. this type of packet includes within the packet a well known and specific MAC destination address). From the well known MAC destination address, it is possible for the communication manager 802 to determine the packet type of this packet. Once the packet type is known, the communication manager 802 knows how to handle the packet. In one embodiment, path selection is not appropriate for spanning tree BPDU packets; thus, the MPLB 702 neither path selects nor load balances these packets. Instead, in one embodiment, the MPLB 702 just forwards the packet unmodified. Thus, for example, if switch u (see FIG. 7) sends a spanning tree BPDU packet to MPLB 702(*u*), then MPLB 702(*u*) just forwards the packet unmodified to the internal switch c.

GVRP BDPU

Another type of topology control packet that may be sent by a switch is a generic attribute registration protocol (GARP) VLAN registration protocol (GVRP) BPDU packet. The purpose of this type of packet is to register a VLAN (or multiple VLAN's) on a particular port or link. For example, if switch u sends a GVRP BDPU packet to MPLB 702(*u*), and if the packet indicates that VLAN X is to be registered, then it means that switch u is trying to register VLAN X on the external link between switch u and MPLB 702(*u*).

Like the spanning tree BDPU, this type of packet also uses well known and specific MAC destination addresses. Thus, based upon the MAC destination address in the packet, this type of packet can be readily identified by the communication manager 802 as a GVRP BDPU. Also, like the spanning tree BDPU, path selection and load balancing is not appropriate (in one embodiment) for this type of packet. Thus, in response to receiving a GVRP BDPU packet, the MPLB 702, and more specifically, the communication manager 802, forwards the packet unmodified. In an example where external switch u (see FIG. 7) sends a GVRP BPDU packet to MPLB 702(*u*), MPLB 702(*u*) would just forward the packet to the internal switch c unmodified.

In contrast to a spanning tree BDPU packet, however, the MPLB 702(*u*), in one embodiment, performs additional processing in response to a GVRP BPDU packet. Specifically, the communication manager 802 of MPLB 702(*u*) interacts with switch c (which is implementing the GVRP protocol) to register the VLAN indicated in the packet on the MPLB's external link. Thus, if, for example, the packet indicates that VLAN X is to be registered, then the communication manager 802 of MPLB 702(*u*) would register VLAN X on the external link between MPLB 702(*u*) and external switch u. Once VLAN X is registered in this way, the communication manager 802 of MPLB 702(*u*) will know that VLAN X is supported on its external link and hence, will allow packets tagged with VLAN X to be sent out on that link. A point to note is that, registered in this way, VLAN X is recognized by MPLB 702(*u*) as an external VLAN only. That VLAN is not one of the internal VLAN's used to switch a packet through the network 300.

Multicast Registration Packets

Another type of packet that an MPLB 702 may receive from an external component is a multicast registration packet. This type of packet is sent by a node to register that node to receive packets sent to a multicast address. A multicast registration packet may be sent as a GARP multicast registration protocol (GMRP) packet or as an Internet protocol group multicast protocol (IGMP) packet. This type of packet uses well known and specific MAC destination addresses. Thus, based upon the MAC destination address in the packet, this type of packet can be readily identified by the communication manager 802 of an MPLB 702 as a multicast registration packet. Included with a multicast registration packet is a multicast address. This multicast address is the address that is to be programmed into the internal switches of the network 300 to cause the internal switches to forward any packet sent to the multicast address to the node that is originating the multicast registration packet. According to current standards, certain address ranges are reserved for multicast addresses; thus, from inspecting the multicast address, it can be readily determined that the address is a multicast address. A multicast registration packet may also be tagged with an external VLAN ID. This VLAN ID indicates the external VLAN that is to be used to carry a multicast packet to the node that is originating the multicast registration packet. In one embodiment, the communication manager 802 of an MPLB 702 processes a multicast registration packet as follows.

Upon receiving a multicast registration packet, the communication manager 802 inspects the MAC destination address of the packet and determines that it is a multicast registration packet. In one embodiment, path selection is appropriate for this type of packet. Thus, the communication manager 802 invokes the path selection manager 804 to select an internal VLAN. In one embodiment, the path selection manager 804 of each of the MPLB's 702 is preconfigured (e.g. given some configuration information) to associate certain multicast addresses with certain internal VLAN's. This configuration information may cause all multicast addresses to be associated with the same internal VLAN (e.g. VLAN 1), or it may cause certain ranges of multicast addresses to be associated with certain internal VLAN's (e.g. all multicast addresses within a first range may be associated with VLAN 1, all multicast addresses within a second range may be associated with VLAN 2, etc.). Based on the configuration information, and the multicast address specified in the registration packet, the path selection manager 804 determines which internal VLAN it should associate with the multicast address, and selects that VLAN. The multicast address is effectively mapped to this internal VLAN.

After the internal VLAN is selected, the path selection manager 804 proceeds to update the multicast registration packet. Before it does so, however, it checks to see if the packet is currently tagged with an external VLAN ID. If it is not, then the path selection manager 804 updates the packet to include information indicating the selected internal VLAN. This may be done as shown in FIGS. 4*b* and 4*c*, wherein the path selecting VLAN information 408 is inserted into the packet. After the packet is updated, it is sent by the communication manager 802 into the network 300.

On the other hand, if the packet is tagged with an external VLAN ID, then the path selection manager 804 updates the packet by overwriting the external VLAN ID in the packet with the ID of the selected internal VLAN. In effect, this maps the external VLAN and the multicast address to the internal VLAN. As part of this mapping, the path selection manager 804 records the external VLAN-multicast address-internal VLAN association. This association enables the path selection manager 804 to perform the reverse mapping when a packet leaves the network 300. After the multicast registration packet is updated to replace the external VLAN ID with the internal VLAN ID, the communication manager 802 forwards the updated packet into the network 300. The multicast registration packet is thus processed by the MPLB 702.

To illustrate the effect of the multicast registration packet on the internal network 300, reference will be made to an example. Suppose that node A of FIG. 7 wishes to register to receive packets sent to multicast address X. In such a case, node A would send a multicast registration packet containing multicast address X to MPLB 702(A). For the sake of simplicity, it will be assumed that this packet does not include an external VLAN ID. Upon receiving this packet, the communication manager 802 of MPLB 702(A) determines that the packet is a multicast registration packet; thus, it invokes the path selection manager 804 to select an internal VLAN. Based upon a set of configuration information and the multicast address X, the path selection manager 804 selects one of the internal VLAN's (assume VLAN 1 for the sake of example). It then updates the packet with the selected VLAN ID. The updated packet is thereafter sent by the communication manager 802 to switch a.

Upon receiving the multicast registration packet, switch a updates its forwarding table to indicate that all packets sent to multicast address X should be forwarded to the port coupled to MPLB 702(A). From the packet, switch a knows that internal VLAN 1 has been associated with multicast address X; thus, it forwards the registration packet on to the next higher switch in VLAN 1, which, in the network of FIG. 7, is switch j. Upon receiving the multicast registration packet, switch j updates its forwarding table to indicate that all packets sent to multicast address X should be forwarded to the port coupled to switch a. From the packet, switch j knows that internal VLAN 1 has been associated with multicast address X; thus, it forwards the registration packet on to the next higher switch in VLAN 1, which, in the network of FIG. 7, is root switch q. Upon receiving the multicast registration packet, root switch q updates its forwarding table to indicate that all packets sent to multicast address X should be forwarded to the port coupled to switch j. Since switch q is the root switch for VLAN 1, it does not forward the multicast registration packet on to any other switch. Node A is thus registered to receive packets sent to the multicast address X.

Suppose now that node P also wishes to register to receive packets sent to multicast address X. In such a case, node P would send a multicast registration packet containing multicast address X to MPLB 702(P). For the sake of simplicity, it will be assumed that this packet does not include an external VLAN ID. Upon receiving this packet, the communication manager 802 of MPLB 702(P) determines that the packet is a multicast registration packet; thus, it invokes the path selection manager 804 to select an internal VLAN. Based upon a set of configuration information (which should be the same as that used by MPLB 702(A)) and the multicast address X, the path selection manager 804 selects one of the internal VLAN's (this VLAN should be the same (i.e. VLAN 1) as that selected previously by the path selection manager 804 of MPLB 702(A)). The path selection manager 804 then updates the packet with the selected VLAN ID. The updated packet is thereafter sent by the communication manager 802 to switch h.

Upon receiving the multicast registration packet, switch h updates its forwarding table to indicate that all packets sent to multicast address X should be forwarded to the port coupled to MPLB 702(P). From the packet, switch h knows that internal VLAN 1 has been associated with multicast address X; thus, it forwards the registration packet on to the next higher switch in VLAN 1, which, in the network of FIG. 7, is switch o. Upon receiving the multicast registration packet, switch o updates its forwarding table to indicate that all packets sent to multicast address X should be forwarded to the port coupled to switch h. From the packet, switch o knows that internal VLAN 1 has been associated with multicast address X; thus, it forwards the registration packet on to the next higher switch in VLAN 1, which, in the network of FIG. 7, is root switch q. Upon receiving the multicast registration packet, root switch q updates its forwarding table to indicate that all packets sent to multicast address X should be forwarded to the port coupled to switch o. Since switch q is the root switch for VLAN 1, it does not forward the multicast registration packet on to any other switch. Node P is thus registered to receive packets sent to the multicast address X. In the above manner, multiple nodes may be registered to receive packets sent to a multicast address.

Multicast Packets

The above discussion addresses the handling of a multicast registration packet. This discussion will focus on the processing of an actual multicast packet, which is a data packet. To facilitate discussion, reference will be made to an example. In the following example, it will be assumed that both nodes A and P of FIG. 7 have been registered to receive packets sent to multicast address X. It will also be assumed that a set of configuration information has been provided to all of the MPLB's 702, and that the configuration information specifies that internal VLAN 1 is to be used to carry the packets sent to multicast address X.

Suppose now that node P sends a data packet having multicast address X to MPLB 702(P). From the multicast address in the packet, the communication manager 802 of MPLB 702(P) determines that this packet is a multicast packet. In one embodiment, path selection is appropriate for this type of packet. Therefore, the communication manager 802 invokes the path selection manager 804 to select a path through the network 300 for this packet.

In response to being invoked, the path selection manager 804 inspects the multicast address X, and using the configuration information noted above, associates the multicast address X with VLAN 1; thus, VLAN 1 is selected as the internal VLAN to use to transport this packet. As noted previously, the configuration information may specify that certain multicast address ranges be mapped to certain internal VLAN's. For example, multicast addresses within a first range may be mapped to VLAN 1, while multicast addresses within a second range may be mapped to VLAN 2, while multicast addresses within a third range may be mapped to VLAN 3, and so forth. By mapping different multicast addresses to different internal VLAN's, it is possible to spread multicast traffic across the multiple internal VLAN's. Thus, a static version of load balancing can be achieved.

After the internal VLAN is selected, the path selection manager 804 proceeds to update the packet with the ID of the selected VLAN. In one embodiment, before it does so, the path selection manager 804 checks to see if the packet is currently tagged with an external VLAN ID. If it is not, then the path selection manager 804 updates the packet to include information indicating the selected internal VLAN. This may be done as shown in FIGS. 4b and 4c, wherein the path selecting VLAN information 408 is inserted into the packet. On the other hand, if the packet is tagged with an external VLAN ID, then the path selection manager 804 updates the packet by overwriting the external VLAN ID in the packet with the ID of the selected internal VLAN. In effect, this maps the external VLAN and the multicast address to the selected internal VLAN. After the packet is updated with path selecting VLAN information, the communication manager 802 forwards the updated packet to switch h.

When switch h receives the packet, it consults its forwarding table and finds that all packets destined for multicast address X should be forwarded to the port coupled to MPLB 702(P) (this is from the previous registration of node P). However, because the packet was received on that port, switch h does not forward the packet back to that port. Instead, because the packet specifies that internal VLAN 1 is to be used to transport the packet through the network 300, switch h forwards the packet to switch o. When switch o receives the packet, it consults its forwarding table and finds that all packets destined for multicast address X should be forwarded to the port coupled to switch h (again, this is from the previous registration of node P). However, because the packet was received on that port, switch o does not forward the packet back to that port. Instead, because the packet specifies that internal VLAN 1 is to be used to transport the packet through the network 300, switch o forwards the packet to root switch q. Upon receiving the multicast packet, root switch q consults its forwarding table and sees that all packets destined for multicast address X should be forwarded to the port coupled to switch i (this is from the previous registration of node A) and the port coupled to switch o (this is from the previous registration of node P). Since the root switch q received the multicast packet on the port coupled to switch o, it does not forward the packet back to that port; thus, in this example, root switch q forwards the packet just to the port coupled to switch i. When switch i receives the packet, it consults its forwarding table and finds that all packets destined for multicast address X should be forwarded to the port coupled to switch a (this is from the previous registration of node A). Thus, it forwards the packet to switch a. In turn, switch a consults its forwarding table and finds that all packets destined for multicast address X should be forwarded to the port coupled to MPLB 702(A) (again, this is from the previous registration of node A). Thus, it forwards the packet to MPLB 702(A).

When the communication manager 802 of MPLB 702(A) receives the packet, it determines from the multicast address that this is a multicast packet. The communication manager 802 then checks its records to see if this multicast address X has an external VLAN associated therewith (recall that an external VLAN-multicast address-internal VLAN association may have been saved as part of the registration process for node A). If the multicast address X does not have an external VLAN associated therewith, then the communication manager 802 removes the path selection VLAN information from the packet and forwards it on to node A. On the other hand, if the multicast address X does have an external VLAN associated with it, then the communication manager 802 replaces the path selection VLAN information in the packet with the external VLAN ID. The communication manager 802 then forwards the updated packet on to node A. In this manner, a multicast packet is transported through the network 300.

Egress Functionality

The above discussion describes the ingress functionality of an MPLB 702. The following discussion will describe the egress functionality. This egress functionality enables the MPLB 702, and more specifically, the communication manager 802 of the MPLB 702, to receive a packet from a switch internal to the network 300, and to either forward that packet to an external component or to process the packet in an appropriate manner.

One type of packet that the communication manager 802 of an MPLB 702 may receive from an internal switch is a forwarded TCP/IP or UDP/IP packet. When it receives such a packet, the communication manager 802 processes the packet to find a set of path-selecting VLAN information (this path-selecting VLAN information was added to the packet by another MPLB 702 when it entered the network 300). The communication manager 802 removes this path-selecting VLAN information from the packet and then forwards the packet to an external component. By doing this, the communication manager 802 makes the existence of the internal VLAN's transparent to the external component.

Another type of packet that the communication manager 802 may receive from an internal switch is a GVRP declaration packet originated by one of the root switches q, r, s, t. The purpose of this packet is to set up one or more VLAN's within the network 300 (the declaration packet contains information indicating which VLAN or VLAN's are to be set up). A GVRP declaration packet is propagated from switch to switch until it reaches an MPLB 702. When the communication manager 802 of an MPLB 702 receives a GVRP declaration packet, it does not forward the packet to an external component. Rather, the communication manager 802 sends a response in the form of a GVRP registration packet. The purpose of this response is to acknowledge receipt of the GVRP declaration packet, and to register the one or more VLAN's specified in the declaration packet on the appropriate switches. This GVRP registration packet, which includes information indicating which VLAN or VLAN's are to be registered, is sent by the communication manager 802 to the internal switch to which the MPLB 702 is coupled. For example, if MPLB 702(A) is sending the GVRP registration packet, that packet would be sent to internal switch a. Upon receiving a GVRP registration packet on a particular port, the internal switch registers the VLAN or VLAN's specified in the packet on that particular port. For example, if internal switch a receives a GVRP registration packet from MPLB 702(A) on the port shown in FIG. 7, and if the registration packet indicates that VLAN 1 is to be registered, then switch c registers VLAN 1 on that port. Thereafter, the link between switch c and MPLB(A) will support VLAN 1. In this manner, the communication manager 802 of an MPLB 702 participates in the establishment of an internal VLAN. As an additional note, in one embodiment, when the communication manager 802 of an MPLB 702 participates in the VLAN establishment process, it updates the VLAN storage 806 of the MPLB 702 to include the ID of the newly established VLAN. By doing so, the communication manager 802 enables the path selection manager 804 to select that VLAN in future path selection and load balancing operations.

Other Functionalities

As noted previously, because an MPLB 702 is deployed at the edge of a network, it performs the functions typically performed by an edge port of an edge switch. One of the typical functions that an edge port performs (if it is so configured) is to add a default VLAN tag to packets that it processes. A default VLAN tag may be added to a packet when it leaves the edge port, and/or when it enters the edge port. This functionality is desirable in some contexts. In one embodiment, the communication manager 802 of an MPLB 702 provides this functionality. Specifically, the communication manager 802 may be configured to add a default VLAN tag to packets ingressing the network 300 and/or add a default VLAN tag to packets egressing the network 300. In one embodiment, if the communication manager 802 adds a default VLAN tag to a packet ingressing the network 300, it does so before invoking the path selection manager 804. That way, the path selection manager 804 will add the path-selecting VLAN information (which is different from the default VLAN tag) to the packet after the default VLAN tag is already present. Doing things in this order ensures that it will be the path-selecting VLAN information and not the default VLAN tag that will be used by the internal switches to switch the packet through the network 300.

Adding a default VLAN tag to packets is just one of the functions that can be performed by an edge port of an edge switch. For purposes of the present invention, the communication manager 802 may be endowed with capability to perform any and all functions performed by an edge port of an edge switch.

Latency Determination

As noted above, in one embodiment, the path selection manager 804 selects an internal VLAN in such a manner as to balance the load across the multiple internal VLAN's. This path selection/load balancing decision may be made based upon current traffic conditions. One of the factors that can be taken into account in determining current traffic conditions is the latency experienced in forwarding packets from one MPLB 702 to another. In one embodiment, the MPLB's cooperate with each other to gather information that can be used to determine latency.

To illustrate how latency can be gathered in accordance with one embodiment of the present invention, reference will now be made to an example. In the following example, it will be assumed that MPLB 702(A) and MPLB(P) are cooperating to determine the latency between them on internal VLAN 1. The latency determination method will be described below using standalone probe packets. However, it should be noted that, if so desired, the latency determination may be carried out by piggybacking additional information onto data packets. The following discussion shows how the latency for VLAN 1 may be determined. The latencies for VLAN's 2, 3, and 4 may be determined in a similar fashion.

The MPLB 702(A), and more specifically, the path selection manager 804 on MPLB 702(A), may initiate the latency determination process by composing a latency request packet. Included in this packet is the address of MPLB 702(A) (source address), the address of MPLB 702(P) (destination address), a current timestamp (referred to as the initial timestamp), an indication that this is a latency request packet, and a set of path-selecting VLAN information indicating that VLAN 1 is to be used to switch the packet to MPLB 702(P). After the path selection manager 804 composes the packet, the packet is sent into the network 300 by the communication manager 802 of MPLB 702(A). Eventually, the packet is switched through the network 300 to MPLB 702(P) using VLAN 1 (it is assumed that reverse path learning has already taken place between the two MPLB's).

When the communication manager 802 of MPLB 702(P) receives the packet, it determines, based upon the information in the packet, that the packet is a latency request packet. Thus, it passes the packet on to the path selection manager 804 of MPLB 702(P) for further processing. In response, the path selection manager 804 adds a current timestamp (referred to as the return timestamp) to the packet. In addition, the path selection manager 804 changes the destination address to the source address and the source address to the destination address. Furthermore, the path selection manager 804 updates the packet to indicate that it is now a latency response packet. After the packet is so processed, it is sent by the communication manager 802 of MPLB 702(P) back into the network 300. Eventually, the packet is switched along internal VLAN 1 back to MPLB 702(A).

When the communication manager 802 of MPLB 702(A) receives the packet, it determines, based upon the information in the packet, that it is a latency response packet. Thus, it passes the packet on to the path selection manager 804 of MPLB 702(A) for further processing. In response, the path selection manager 804 determines a current timestamp (referred to as the received timestamp). In addition, the path selection manager 804 determines, based upon the various timestamps, the latency experienced on VLAN 1. The sending latency (the latency between the MPLB 702(A) and MPLB 702(P)) may be determined by subtracting the initial timestamp from the return timestamp. The return latency (the latency between the MPLB 702(P) and MPLB 702(A)) may be determined by subtracting the return timestamp from the received timestamp. The roundtrip latency may be determined by subtracting the initial timestamp from the received timestamp. Once the latencies are determined, the path selection manager 804 may make further calculations. For example, the path selection manager 804 may compare these latencies with previously determined latencies for VLAN 1 to determine whether the latency is improving or worsening. The path selection manager 804 may also use these and previously determined latencies for VLAN 1 to determine a standard deviation. Furthermore, the path selection manager 804 may compare these latencies with the latencies of other VLAN's to determine which VLAN is currently the fastest. These and other calculations may be made. Given the results of the calculations, the path selection manager 804 will be able to make good path selection/load balancing decisions in the future.

In the above example, MPLB's 702(A) and 702(P) are assumed to have addresses; thus, it is possible for the MPLB's 702(A), 702(P) to send packets directly to each other. In some implementations, however, the MPLB's 702(A), 702(P) may not have addresses or it may not be possible or desirable to send packets directly to the MPLB's 702. In such implementations, a slightly altered methodology may be used. To illustrate this methodology, reference will be made to an example.

Suppose that MPLB 702(A) receives a packet from node A which is destined for node B. This packet would have the address of node A as the source address and the address of node P as the destination address. Suppose further that MPLB 702(A) selects internal VLAN 1 as the VLAN to use to transport this packet through the network 300. Given just this information, MPLB 702(A) does not know that the packet will be delivered to node P through MPLB 702(P). Nonetheless, MPLB 702(A) can cooperate with MPLB 702(P) to determine the latency on VLAN 1. This may be done in the following manner.

Initially, the path selection manager 804 of MPLB 702(A) composes a latency request packet (this is a separate packet from the packet received from node A). This latency request packet made be composed in the same manner as that described above. However, instead of using the address of MPLB 702(A) as the source address, and the address of MPLB 702(P) as the destination address, the path selection manager 804 uses the address of node A as the source address and the address of node P as the destination address. After the latency packet is composed, the communication manager 802 of MPLB 702(A) sends the packet into the network 300. Eventually, the packet is switched through the network 300 to MPLB 702(P) using VLAN 1 (it is assumed that reverse path learning has already taken place between the two MPLB's).

When the communication manager 802 of MPLB 702(P) receives the packet, it determines, based upon the information in the packet, that the packet is a latency request packet. Thus, even though the packet is supposedly destined for node P, the communication manager 802 does not forward it to node P. Instead, the communication manager 802 passes the packet on to the path selection manager 804 of MPLB 702(P) for further processing. In response, the path selection manager 804 adds a current timestamp (referred to as the return timestamp) to the packet. In addition, the path selection manager 804 changes the destination address to the source address and the source address to the destination address. Furthermore, the path selection manager 804 updates the packet to indicate that it is now a latency response packet. After the packet is so processed, it is sent by the communication manager 802 of MPLB 702(P) back into the network 300. Eventually, the packet is switched along internal VLAN 1 back to MPLB 702(A).

When the communication manager 802 of MPLB 702(A) receives the packet, it determines, based upon the information in the packet, that it is a latency response packet. Thus, even though the packet is supposedly destined for node A, the communication manager 802 does not forward it to node A. Instead, the communication manager 802 passes the packet on to the path selection manager 804 of MPLB 702(A) for further processing. In response, the path selection manager

804 performs the processing described above to derive the information noted above. In this manner, the MPLB's 702 (A), 702(P) are able to cooperate with each other to derive latency information for VLAN 1 even though they do not have their own addresses, and even though they do not even know that they are interacting specifically with each other.

Further Alternative Embodiment

Thus far, the MPLB 702 has been described as being a separate, standalone component. It should be noted, however, that if so desired, the functionality of the MPLB 702 may be incorporated into one or more of the edge ports of a switch. Also, each MPLB 702 has been shown as being coupled to only one edge port. It should be noted, however, that if so desired, an MPLB 702 may be coupled to multiple edge ports and even to multiple edge switches. These and other embodiments are within the scope of the present invention.

At this point, it should be noted that although the invention has been described with reference to one or more specific embodiments, it should not be construed to be so limited. Various modifications may be made by those of ordinary skill in the art with the benefit of this disclosure without departing from the spirit of the invention. For example, the network 300 shown in FIG. 3 is just a sample network. This switching topology can be extended to include more switches, to switches with fewer or more ports, to fewer or more hierarchical levels of switches, to fewer or more VLAN's and VLAN paths, etc. These and other modifications and extensions are possible. Thus, the invention should not be limited by the specific embodiments used to illustrate it but only by the scope of the issued claims and the equivalents thereof.

What is claimed is:

1. In a system comprising a network and a border component situated at a border of the network, wherein the network is a loop-free, reverse-path-learning network, and wherein the network is divided into a plurality of virtual networks, a method performed by the border component, comprising:
   receiving a packet from an external component situated outside the border of the network, the packet comprising a destination address;
   determining a packet type for the packet;
   determining whether to perform a load balancing function for the packet by determining whether path selection is appropriate for the packet type;
   in response to a determination that path selection is not appropriate for the packet type, processing the packet in a manner that is appropriate for the packet type, wherein processing does not comprise selecting a path through the network for the packet; and
   in response to a determination that path selection is appropriate for the packet type:
      determining a set of one or more virtual networks that can be used to transport the packet through the network, wherein the set of virtual networks is at least a subset of the plurality of virtual networks, and wherein each virtual network in the set of virtual networks provides a different path through the network;
      selecting a particular virtual network from the set of virtual networks, thereby, selecting a particular path to take through the network;
      updating the packet to include information indicating the particular virtual network that has been selected to derive an updated packet; and
      sending the updated packet into the network to be transported through the network along the particular path.

2. The method of claim 1, wherein all of the virtual networks in the set of virtual networks are concurrently active such that any of the virtual networks in the set of virtual networks can be selected.

3. The method of claim 2, wherein selecting a particular virtual network comprises:
   selecting, in a random manner, one of the virtual networks in the set of virtual networks to be the particular virtual network.

4. The method of claim 2, wherein selecting a particular virtual network comprises:
   selecting, in a round-robin fashion, one of the virtual networks in the set of virtual networks to be the particular virtual network.

5. The method of claim 2, wherein the set of virtual networks provides multiple paths through the network, and wherein selecting a particular virtual network comprises:
   determining which of the multiple paths is currently experiencing the lowest traffic load; and
   selecting the virtual network associated with that path as the particular virtual network.

6. The method of claim 2, wherein the set of virtual networks provides multiple paths through the network, and wherein selecting a particular virtual network comprises:
   determining which of the multiple paths currently has the most available capacity for carrying traffic; and
   selecting the virtual network associated with that path as the particular virtual network.

7. The method of claim 2, wherein the set of virtual networks provides multiple paths through the network, and wherein selecting a particular virtual network comprises:
   determining which of the multiple paths currently has the shortest latency; and
   selecting the virtual network associated with that path as the particular virtual network.

8. The method of claim 7, wherein the system further comprises another border component situated at another part of the border of the network, wherein the set of virtual networks provides multiple paths through the network between the border component and the other border component, and wherein the method further comprises:
   interacting with the other border component to determine a current latency for each of the multiple paths.

9. The method of claim 8, wherein interacting with the other border component comprises:
   sending a request packet to the other border component along a selected path, wherein the selected path is one of the multiple paths, and wherein the request packet comprises an initial timestamp;
   receiving a response packet from the other border component, wherein the response packet was also sent along the selected path, and wherein the response packet comprises the initial timestamp and a return timestamp provided by the other border component; and
   determining a latency for the selected path based at least partially upon the initial timestamp and the return timestamp.

10. The method of claim 2, wherein the set of virtual networks provides multiple paths through the network, and wherein selecting a particular virtual network comprises:
   determining current traffic conditions for at least some of the multiple paths; and
   selecting one of the virtual networks in the set of virtual networks to be the particular virtual network based upon the current traffic conditions.

11. The method of claim 1, wherein the packet is determined to be a spanning tree type of packet, wherein it is determined that path selection is not appropriate for this type of packet, and wherein processing the packet comprises:
  forwarding the packet, unmodified, into the network.

12. The method of claim 1, wherein the packet is determined to be a virtual network registration type of packet, wherein it is determined that path selection is not appropriate for this type of packet, and wherein processing the packet comprises:
  extracting an identifier of an external virtual network from the packet;
  forwarding the packet, unmodified, into the network; and
  registering the external virtual network to enable the border component to recognize that the external virtual network is supported on a link between the border component and the external component.

13. The method of claim 1, wherein the packet is determined to be a multicast registration type of packet, wherein the packet comprises an identifier of an external virtual network, wherein it is determined that path selection is appropriate for this type of packet, and wherein updating the packet comprises:
  overwriting the identifier of the external virtual network with the information indicating the particular virtual network that has been selected, thereby mapping the external virtual network to the particular virtual network.

14. The method of claim 1, wherein the packet is determined to be a multicast registration type of packet, wherein the packet comprises a multicast address, wherein it is determined that path selection is appropriate for this type of packet, and wherein determining the set of virtual networks comprises:
  mapping the multicast address to at least one virtual network.

15. The method of claim 1, wherein the packet is determined to be a multicast type of packet, wherein the packet comprises an identifier of an external virtual network, wherein it is determined that path selection is appropriate for this type of packet, and wherein updating the packet comprises:
  overwriting the identifier of the external virtual network with the information indicating the particular virtual network that has been selected, thereby mapping the external virtual network to the particular virtual network.

16. The method of claim 1, wherein the packet is determined to be a multicast type of packet, wherein the packet comprises a multicast address, wherein it is determined that path selection is appropriate for this type of packet, and wherein determining the set of virtual networks comprises:
  mapping the multicast address to at least one virtual network.

17. The method of claim 1, further comprising:
  receiving an outgoing packet from a switch within the network, the outgoing packet comprising information indicating which virtual network within the network was used to transport the outgoing packet to the border component;
  removing from the packet the information indicating which virtual network within the network was used to transport the outgoing packet to the border component to derive a revised packet; and
  sending the revised packet out of the network.

18. The method of claim 1, further comprising:
  receiving a virtual network declaration packet from a switch within the network, wherein the virtual network declaration packet comprises an indication of a certain virtual network that is to be established within the network;
  composing a virtual network registration packet in response to the virtual network declaration packet, the virtual network registration packet comprising information pertaining to the certain virtual network that is to be established; and
  sending the virtual network registration packet into the network to cause the certain virtual network to be registered on a port of one or more switches within the network.

19. The method of claim 18, wherein the border component does not send the virtual network declaration packet out of the network.

20. A border component situated at a border of a network, wherein the network is a loop-free, reverse-path-learning network, and wherein the network is divided into a plurality of virtual networks, the border component comprising:
  means for receiving a packet from an external component situated outside the border of the network, the packet comprising a destination address;
  means for determining a packet type for the packet;
  means for determining whether to perform a load balancing function for the packet by determining whether path selection is appropriate for the packet type;
  means for processing, in response to a determination that path selection is not appropriate for the packet type, the packet in a manner that is appropriate for the packet type, wherein processing does not comprise selecting a path through the network for the packet; and
  means for performing the following in response to a determination that path selection is appropriate for the packet type:
    determining a set of one or more virtual networks that can be used to transport the packet through the network, wherein the set of virtual networks is at least a subset of the plurality of virtual networks, and wherein each virtual network in the set of virtual networks provides a different path through the network;
    selecting a particular virtual network from the set of virtual networks, thereby, selecting a particular path to take through the network;
    updating the packet to include information indicating the particular virtual network that has been selected to derive an updated packet; and
    sending the updated packet into the network to be transported through the network along the particular path.

21. The border component of claim 20, wherein all of the virtual networks in the set of virtual networks are concurrently active such that any of the virtual networks in the set of virtual networks can be selected.

22. The border component of claim 21, wherein selecting a particular virtual network comprises:
  selecting, in a random manner, one of the virtual networks in the set of virtual networks to be the particular virtual network.

23. The border component of claim 21, wherein selecting a particular virtual network comprises:
  selecting, in a round-robin fashion, one of the virtual networks in the set of virtual networks to be the particular virtual network.

24. The border component of claim 21, wherein the set of virtual networks provides multiple paths through the network, and wherein selecting a particular virtual network comprises:

determining which of the multiple paths is currently experiencing the lowest traffic load; and
selecting the virtual network associated with that path as the particular virtual network.

25. The border component of claim 21, wherein the set of virtual networks provides multiple paths through the network, and wherein selecting a particular virtual network comprises:
determining which of the multiple paths currently has the most available capacity for carrying traffic; and
selecting the virtual network associated with that path as the particular virtual network.

26. The border component of claim 21, wherein the set of virtual networks provides multiple paths through the network, and wherein selecting a particular virtual network comprises:
determining which of the multiple paths currently has the shortest latency; and
selecting the virtual network associated with that path as the particular virtual network.

27. The border component of claim 26, wherein the system further comprises another border component situated at another part of the network, wherein the set of virtual networks provides multiple paths through the network between the border component and the other border component, and wherein the border component further comprises:
means for interacting with the other border component to determine a current latency for each of the multiple paths.

28. The border component of claim 27, wherein the means for interacting with the other border component comprises:
means for sending a request packet to the other border component along a selected path, wherein the selected path is one of the multiple paths, and wherein the request packet comprises an initial timestamp;
means for receiving a response packet from the other border component, wherein the response packet was also sent along the selected path, and wherein the response packet comprises the initial timestamp and a return timestamp provided by the other border component; and
means for determining a latency for the selected path based at least partially upon the initial timestamp and the return timestamp.

29. The border component of claim 21, wherein the set of virtual networks provides multiple paths through the network, and wherein selecting a particular virtual network comprises:
determining current traffic conditions for at least some of the multiple paths; and
selecting one of the virtual networks in the set of virtual networks to be the particular virtual network based upon the current traffic conditions.

30. The border component of claim 20, wherein the packet is determined to be a spanning tree type of packet, wherein it is determined that path selection is not appropriate for this type of packet, and wherein the means for processing the packet comprises:
means for forwarding the packet, unmodified, into the network.

31. The border component of claim 20, wherein the packet is determined to be a virtual network registration type of packet, wherein it is determined that path selection is not appropriate for this type of packet, and wherein the means for processing the packet comprises:
means for extracting an identifier of an external virtual network from the packet;
means for forwarding the packet, unmodified, into the network; and
means for registering the external virtual network to enable the border component to recognize that the external virtual network is supported on a link between the border component and the external component.

32. The border component of claim 20, wherein the packet is determined to be a multicast registration type of packet, wherein the packet comprises an identifier of an external virtual network, wherein it is determined that path selection is appropriate for this type of packet, and wherein updating the packet comprises:
overwriting the identifier of the external virtual network with the information indicating the particular virtual network that has been selected, thereby mapping the external virtual network to the particular virtual network.

33. The border component of claim 20, wherein the packet is determined to be a multicast registration type of packet, wherein the packet comprises a multicast address, wherein it is determined that path selection is appropriate for this type of packet, and wherein determining the set of virtual networks comprises:
mapping the multicast address to at least one virtual network.

34. The border component of claim 20, wherein the packet is determined to be a multicast type of packet, wherein the packet comprises an identifier of an external virtual network, wherein it is determined that path selection is appropriate for this type of packet, and wherein updating the packet comprises:
overwriting the identifier of the external virtual network with the information indicating the particular virtual network that has been selected, thereby mapping the external virtual network to the particular virtual network.

35. The border component of claim 20, wherein the packet is determined to be a multicast type of packet, wherein the packet comprises a multicast address, wherein it is determined that path selection is appropriate for this type of packet, and wherein determining the set of virtual networks comprises:
mapping the multicast address to at least one virtual network.

36. The border component of claim 20, further comprising:
means for receiving an outgoing packet from a switch within the network, the outgoing packet comprising information indicating which virtual network within the network was used to transport the outgoing packet to the border component;
means for removing from the packet the information indicating which virtual network within the network was used to transport the outgoing packet to the border component to derive a revised packet; and
means for sending the revised packet out of the network.

37. The border component of claim 20, further comprising:
means for receiving a virtual network declaration packet from a switch within the network, wherein the virtual network declaration packet comprises an indication of a certain virtual network that is to be established within the network;
means for composing a virtual network registration packet in response to the virtual network declaration packet, the virtual network registration packet comprising information pertaining to the certain virtual network that is to be established; and means for sending the virtual network registration packet into the network to cause the certain virtual network to be registered on a port of one or more switches within the network.

38. The border component of claim 37, wherein the border component does not send the virtual network declaration packet out of the network.

39. The border component of claim 20, wherein the border component is a standalone component that couples the external component to the network.

40. The border component of claim 20, wherein the network comprises a switch, wherein the external component is coupled to a port of the switch, and wherein the border component is a part of the port of the switch.

41. A method of performing load balancing, the method comprising:
dividing a network into a plurality of virtual networks for the purpose of facilitating load balancing of packets, the network including a boarder component situated at a boarder of the network, wherein the plurality of virtual networks provides a plurality of paths through the network, and wherein the network is a loop-free, reverse-path- learning network;
receiving, by the border component, a packet from an external component situated outside the border of the network, the packet comprising a destination address;
determining a packet type of the received packet;
determining whether to perform a load balancing function for the received packet by determining whether path selection among the plurality of virtual networks is appropriate for the received packet based on the determined packet type;
in response to a determination that path selection is not appropriate for the received packet, processing the received packet in a manner that is appropriate for the received packet based on the determined packet type, wherein said processing excludes selecting a path for the received packet from among the plurality of paths through the network provided by the plurality of virtual networks; and
in response to a determination that path selection is appropriate for the received packet:
determining a set of one or more virtual networks of the plurality of virtual network that can be used to transport the received packet through the network, wherein each virtual network in the set of virtual networks provides a different path through the network;
selecting a particular virtual network from the set of virtual networks, thereby, selecting a particular path for the received packet of the plurality of paths to take through the network;
updating the received packet to include information indicating the particular virtual network that has been selected to derive an updated packet; and
sending the updated packet into the network to be transported through the network along the particular path.

42. The method of claim 41, wherein all of the virtual networks in the set of virtual networks are concurrently active such that any of the virtual networks in the set of virtual networks can be selected.

43. The method of claim 42, wherein said selecting a particular virtual network comprises one of:
selecting, in a random manner, one of the virtual networks in the set of virtual networks to be the particular virtual network; and
selecting, in a round-robin fashion, one of the virtual networks in the set of virtual networks to be the particular virtual network.

44. The method of claim 42, wherein said selecting a particular virtual network comprises:
determining which of the plurality of paths is currently experiencing a lowest traffic load; and
selecting the virtual network associated with the determined path as the particular virtual network.

45. The method of claim 42, wherein said selecting a particular virtual network comprises:
determining which of the plurality of paths currently has a highest available capacity for carrying traffic; and
selecting the virtual network associated with the determined path as the particular virtual network.

46. The method of claim 42, wherein said selecting a particular virtual network comprises:
determining which of the plurality of paths currently has a shortest latency; and
selecting the virtual network associated with the determined path as the particular virtual network.

47. The method of claim 42, wherein the system further comprises another border component situated at another part of the border of the network, wherein the set of virtual networks provides multiple paths through the network between the border component and the other border component, and wherein the method further comprises:
interacting with the other border component to determine a current latency for each of the multiple paths.

48. The method of claim 47, wherein interacting with the other border component comprises:
sending a request packet to the other border component along a selected path, wherein the selected path is one of the multiple paths, and wherein the request packet comprises an initial timestamp;
receiving a response packet from the other border component, wherein the response packet was also sent along the selected path, and wherein the response packet comprises the initial timestamp and a return timestamp provided by the other border component; and
determining a latency for the selected path based at least partially upon the initial timestamp and the return timestamp.

49. The method of claim 42, wherein said selecting a particular virtual network comprises:
determining current traffic conditions for at least some of the plurality of paths; and
selecting one of the virtual networks in the set of virtual networks to be the particular virtual network based upon the current traffic conditions.

50. The method of claim 41, wherein the received packet is determined to be a topology control type of packet and wherein it is determined that path selection is not appropriate for the received packet.

51. The method of claim 50, wherein said processing the received packet comprises forwarding the received packet, unmodified, into the network.

52. The method of claim 50, wherein said processing the received packet comprises:
extracting an identifier of an external virtual network from the received packet;
forwarding the received packet, unmodified, into the network; and
registering the external virtual network to enable the border component to recognize that the external virtual network is supported on a link between the border component and the external component.

53. The method of claim 41, wherein the received packet is determined to be a multicast registration type of packet, wherein the received packet comprises an identifier of an external virtual network, wherein it is determined that path selection is appropriate the received packet, and wherein updating the received packet comprises overwriting the identifier of the external virtual network with the information indicating the particular virtual network that has been selected, thereby mapping the external virtual network to the particular virtual network.

54. The method of claim 41, wherein the received packet is determined to be a multicast registration type of packet, wherein the received packet comprises a multicast address, wherein it is determined that path selection is appropriate for the received packet, and wherein determining the set of virtual networks comprises mapping the multicast address to at least one virtual network.

55. The method of claim 41, wherein the received packet is determined to be a multicast type of packet, wherein the received packet comprises an identifier of an external virtual network, wherein it is determined that path selection is appropriate for the received packet, and wherein updating the packet comprises overwriting the identifier of the external virtual network with the information indicating the particular virtual network that has been selected, thereby mapping the external virtual network to the particular virtual network.

56. The method of claim 41, wherein the received packet is determined to be a multicast type of packet, wherein the received packet comprises a multicast address, wherein it is determined that path selection is appropriate for the received packet, and wherein determining the set of virtual networks comprises mapping the multicast address to at least one virtual network.

* * * * *